No. 657,928. Patented Sept. 18, 1900.
J. FELBEL.
TYPE WRITING MACHINE.
(Application filed Apr. 12, 1900.)
(No Model.) 8 Sheets—Sheet 2.

WITNESSES: INVENTOR:

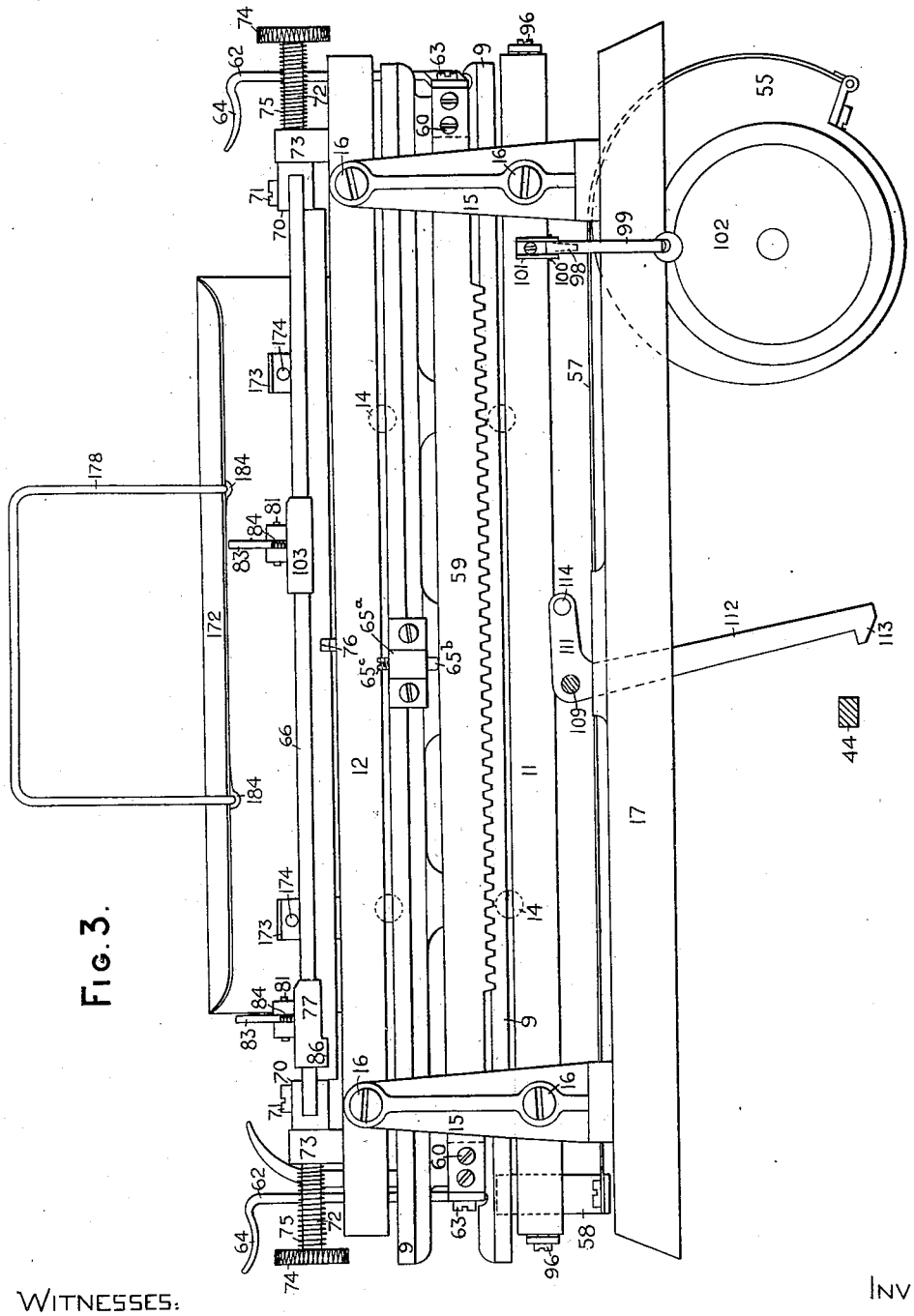

No. 657,928. Patented Sept. 18, 1900.
J. FELBEL.
TYPE WRITING MACHINE.
(Application filed Apr. 12, 1900.)
(No Model.) 8 Sheets—Sheet 4.
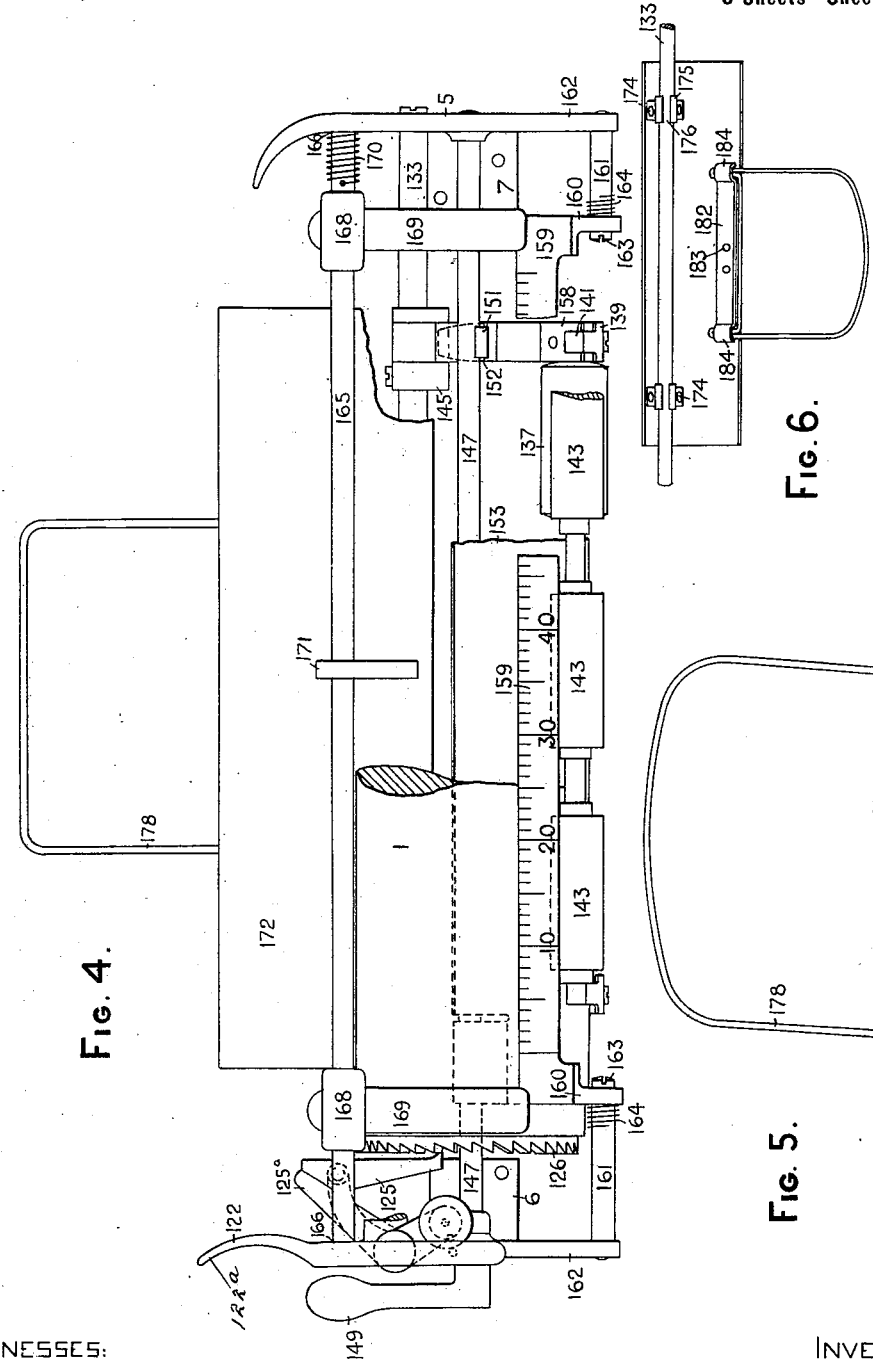
WITNESSES:
INVENTOR:
Jacob Felbel

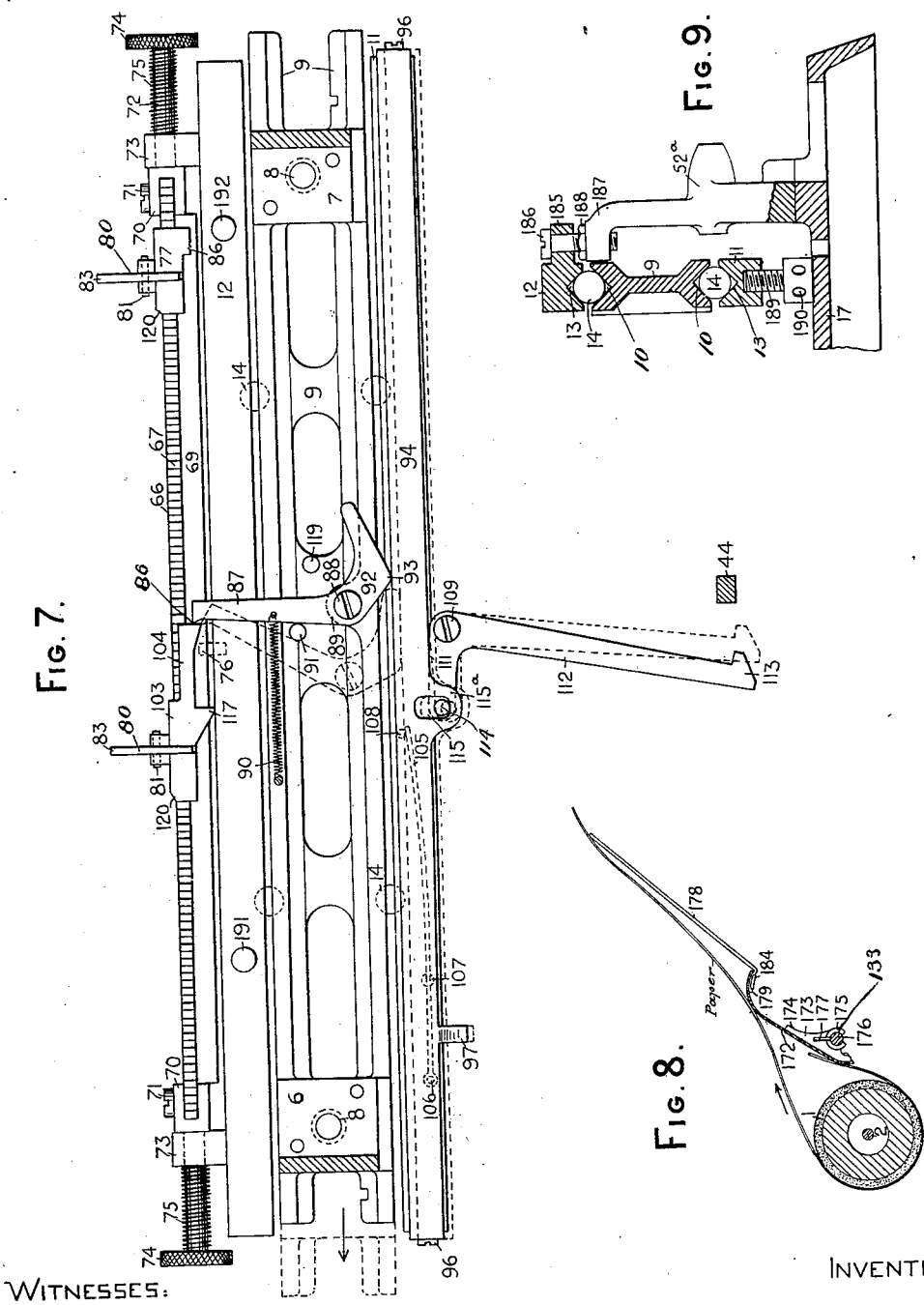

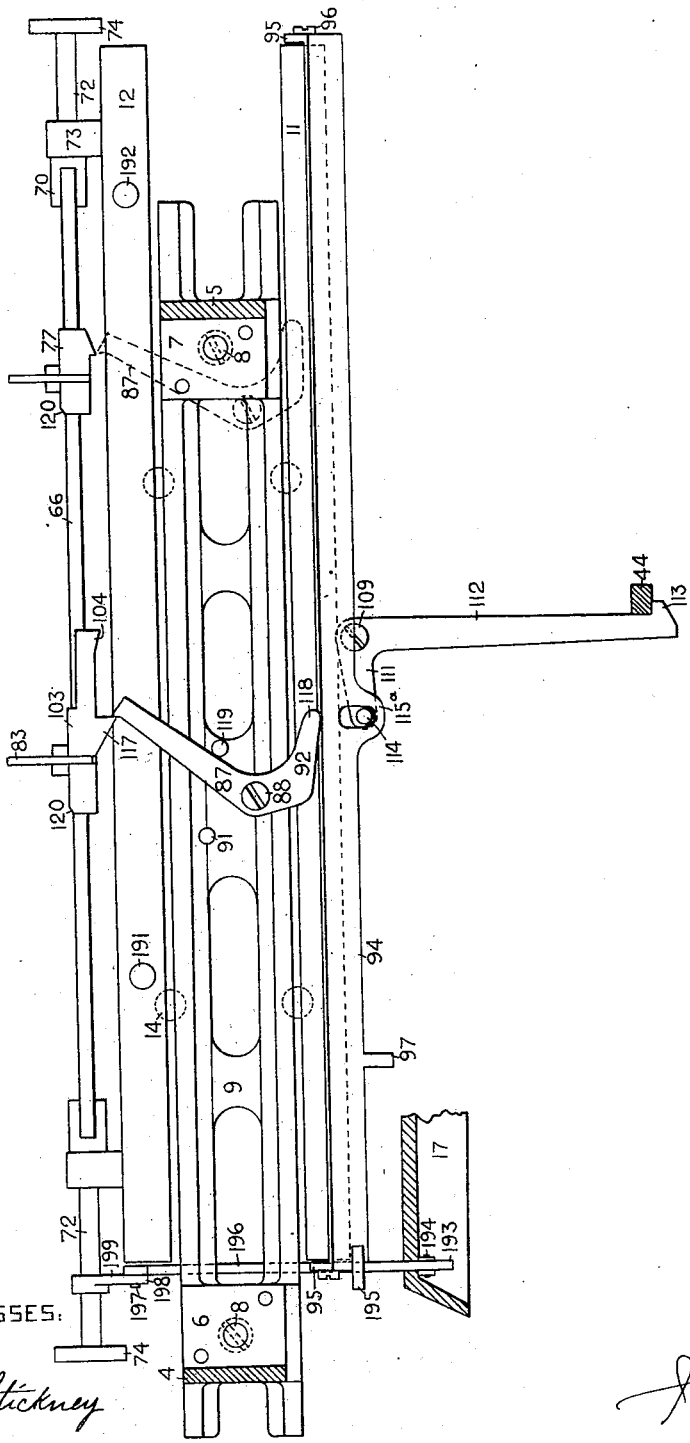

No. 657,928. Patented Sept. 18, 1900.
J. FELBEL.
TYPE WRITING MACHINE.
(Application filed Apr. 12, 1900.)
(No Model.) 8 Sheets—Sheet 7.
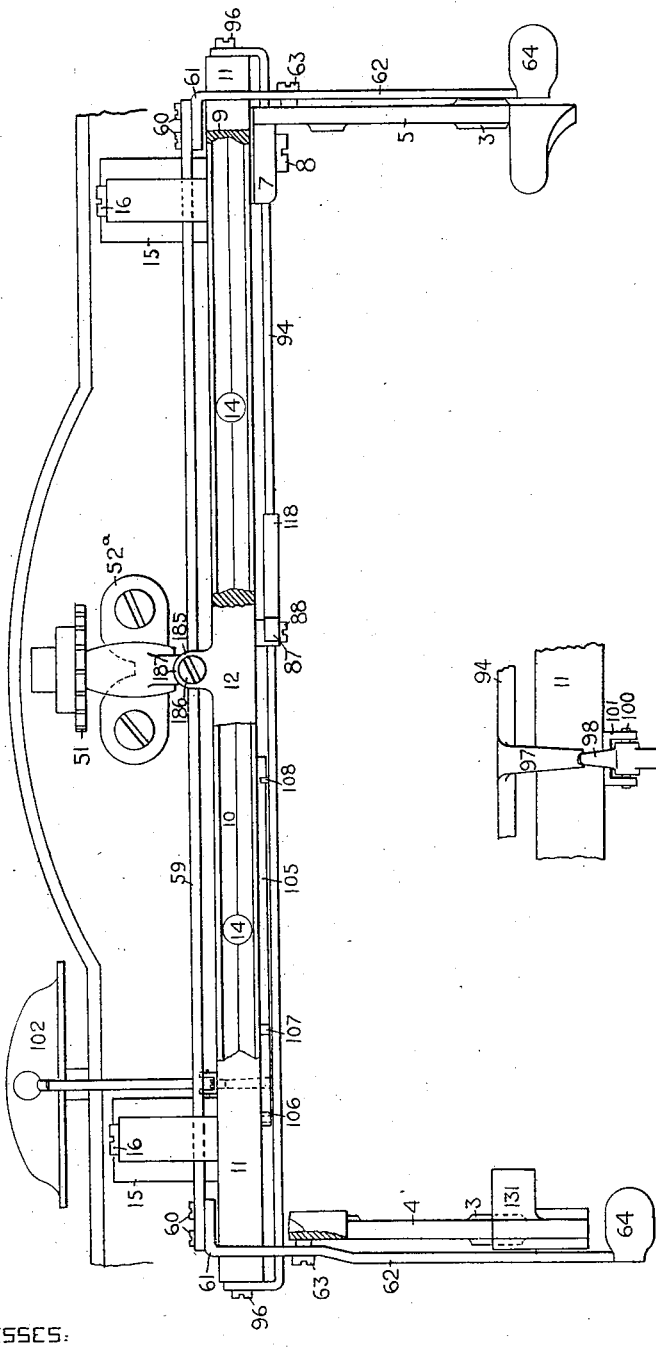
WITNESSES:
B. C. Stickney
Carl Gabrielson
INVENTOR:
Jacob Felbel No. 657,928. Patented Sept. 18, 1900.
J. FELBEL.
TYPE WRITING MACHINE.
(Application filed Apr. 12, 1900.)
(No Model.) 8 Sheets—Sheet 8.
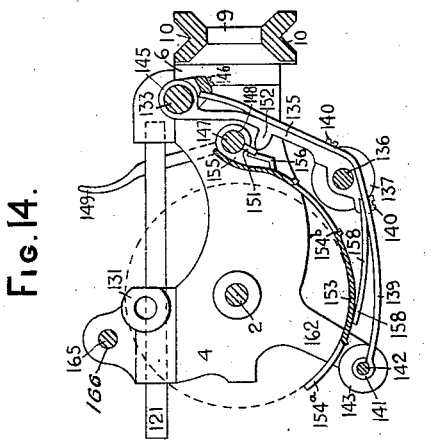
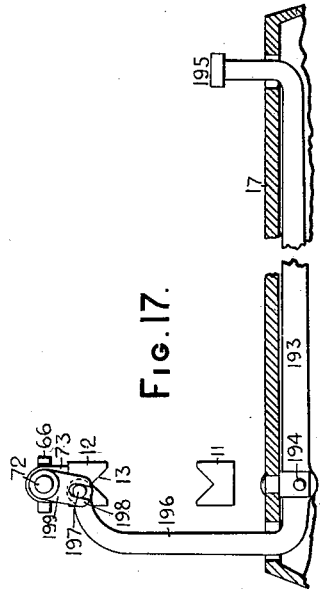
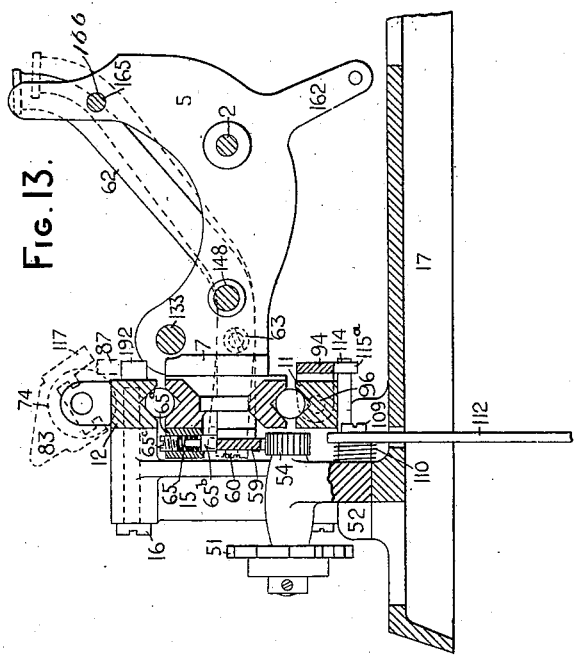
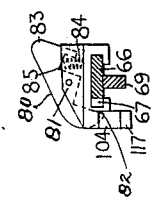
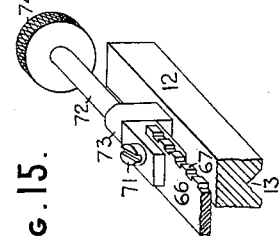
WITNESSES: INVENTOR:
B. B. Stickney Jacob Felbel
Carl Gabrielson

UNITED STATES PATENT OFFICE.

JACOB FELBEL, OF NEW YORK, N. Y.

TYPE-WRITING MACHINE.

SPECIFICATION forming part of Letters Patent No. 657,928, dated September 18, 1900.

Application filed April 12, 1900. Serial No. 12,498. (No model.)

*To all whom it may concern:*

Be it known that I, JACOB FELBEL, a citizen of the United States, and a resident of the borough of Manhattan, city of New York, in the county of New York and State of New York, have invented certain new and useful Improvements in Type-Writing Machines, of which the following is a specification.

The present invention relates to the paper-carriage mechanism and line-locking mechanism of type-writing machines; and its object is to simplify and improve the construction and operation thereof.

To this end the invention consists in certain combinations of devices and features of construction, all of which will be more fully hereinafter described, and particularly pointed out in the concluding claims.

Figure 1:
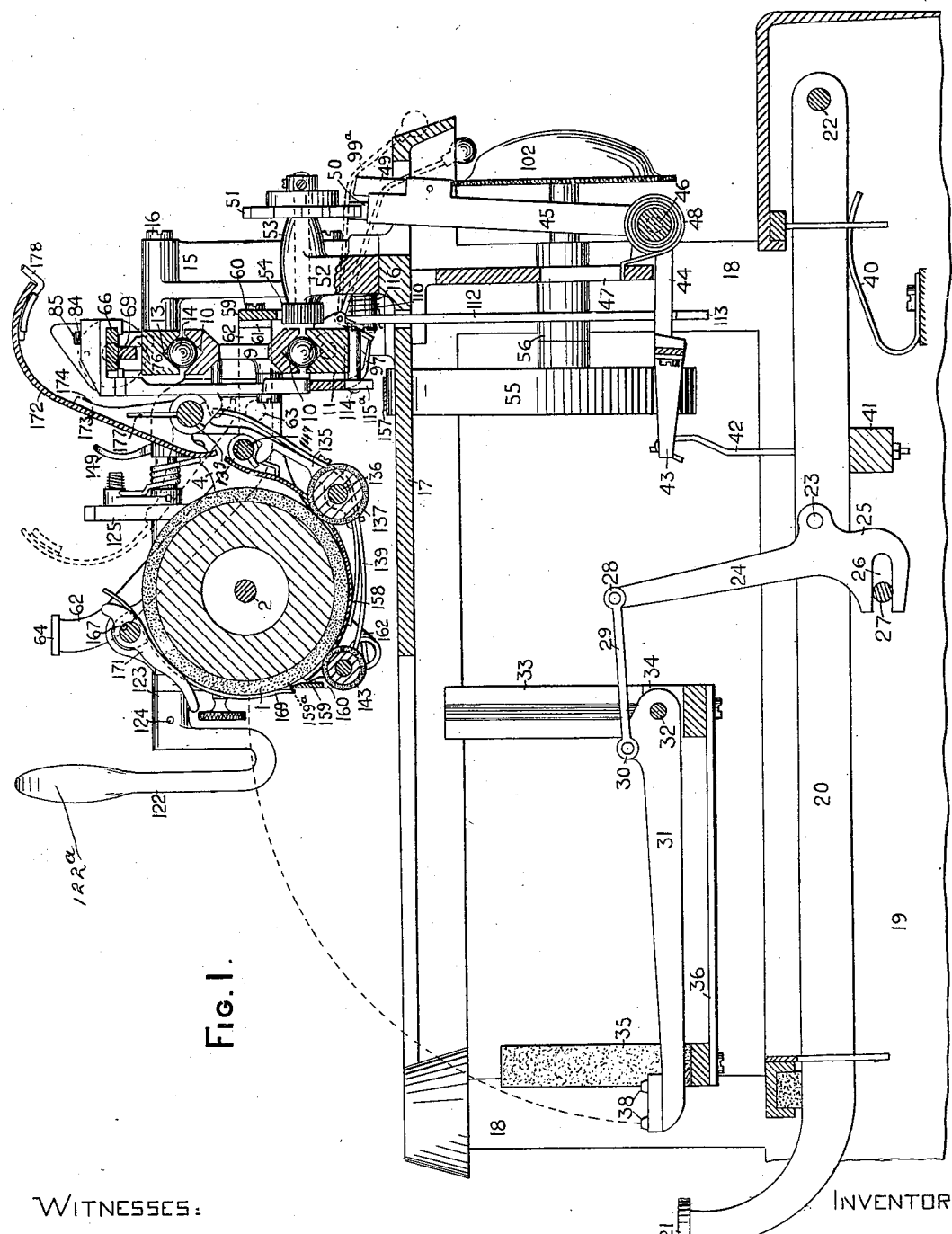
Figure 2:
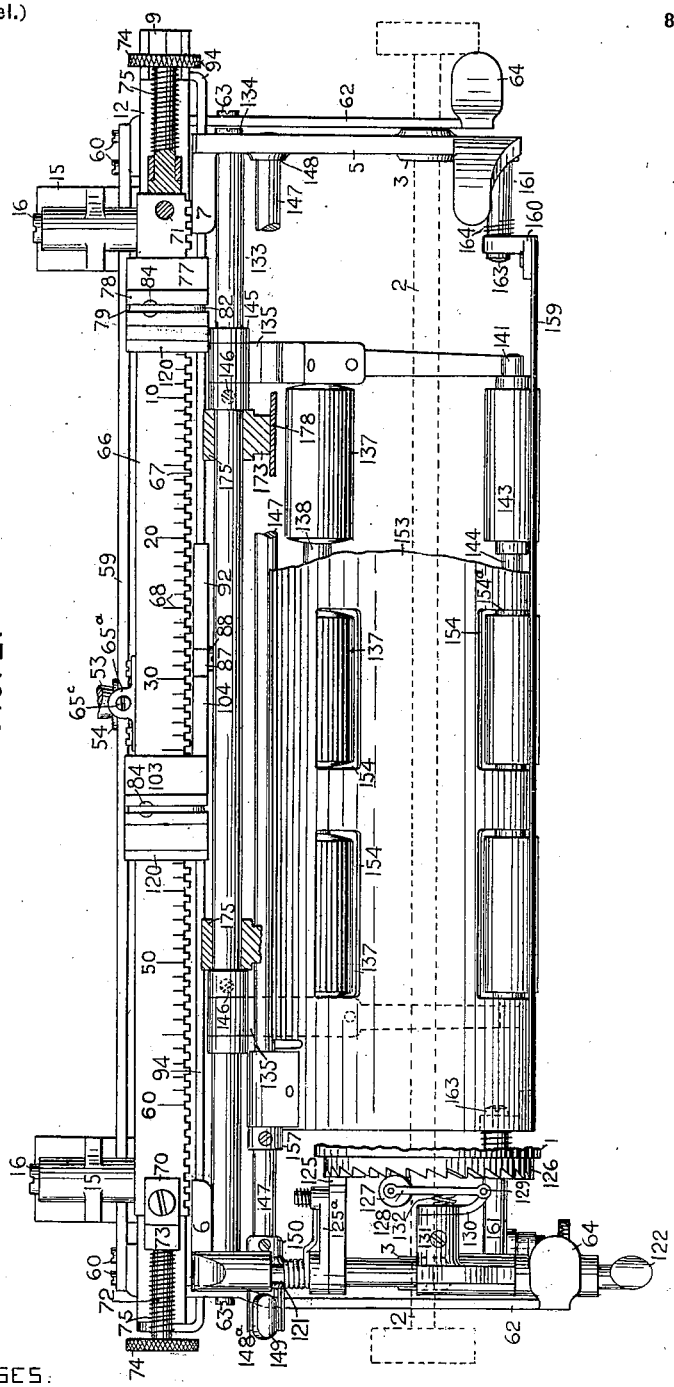

In the accompanying drawings, Figure 1 is a central longitudinal vertical section of a front-strike type-writing machine embodying my improvements. Fig. 2 is a plan view of the carriage. In this and other figures certain parts are broken away and others omitted for the sake of clearness. Fig. 3 is a rear elevation of the carriage and top plate. Fig. 4 is a front elevation of the carriage. Fig. 5 is a perspective view of a detachable paper-support. Fig. 6 is a view of the under side of the paper-shelf, showing the detachable paper-support in position thereon. Fig. 7 is a front view of the carriage-tracks, including the line-locking mechanism, the side bars of the platen-frame being shown in section. Fig. 8 is a diagrammatic side view of the platen, paper-shelf, and detachable paper-support, showing a sheet of paper in position thereon. Fig. 9 is a fragmentary view of the carriage-tracks similar to that shown at Fig. 1, but showing the method of straightening said tracks. Fig. 10 is a view similar to Fig. 7, but showing the position assumed by the parts at the line-locking operation and also showing a line-lock-release key extending to the front of the machine. Fig. 11 is a plan view showing a part of the carriage-frame, also the carriage-release and other mechanism. Fig. 12 is a view of the under side of the bell-hammer and its operating-arm. Fig. 13 is a sectional elevation of the carriage-frame, showing the right-hand end of the carriage. Fig. 14 is a similar view showing the left-hand end of the carriage. Fig. 15 is a perspective view of one end of the margin-stop bar, showing the method of journaling the same. Fig. 16 is a vertical section through the right-hand margin-stop at Fig. 2, showing the locking-lever disengaged from the rack. Fig. 17 is an elevation showing the key-lever pivoted under the top plate and connected to rock the margin-gage bar.

Throughout the several views the same part is designated by the same numeral of reference.

1 designates a cylindrical platen which is mounted upon a platen-shaft 2, the latter being journaled at 3 in parallel end bars 4 5 of an overhanging platen frame or carriage. These end bars are in the form of vertical plates and at their rear ends are provided with inwardly-extending angle-pieces 6 7, which are secured by screws 8 to a slide-bar 9, said slide-bar and end bars or arms taken together forming a rigid U frame or carriage, open in front, upon which is mounted the paper-feeding and other mechanism traveling with the carriage. Said slide-bar 9 is provided upon its upper and lower edges with longitudinally-extending V-grooves 10. Arranged directly below said bar 9 is a fixed carriage-track 11 for supporting and guiding the slide-bar, and directly over said bar 9 is a track 12 for holding upright and guiding the slide-bar, said tracks being provided with V-grooves 13 to match the grooves 10 formed upon said carriage-bar 9. Bearing-balls 14 are disposed in the ball ways or races formed by said oppositely-disposed V-grooves, the balls in the lower ballway serving to support and guide and those in the upper ballway to guide the carriage. In place of these balls rollers may be used—such, for instance, as shown in United States Patent No. 599,429, of February 22, 1898, granted to G. B. Webb—and wherever in the claims the term "rollers" is used I intend to cover the use of either rollers or balls. These brackets or rails are supported by a pair of upright brackets 15, to which they are secured by horizontal screws 16, one screw at each end of each rail. The brackets 15 are suitably secured upon the top plate 17. The latter is supported upon four corner-posts 18, which may be formed integrally with a rectangular base 19. A series of horizontal levers 20 is arranged longitudinally in the base, their forward ends being provided with keys 21 and their rear ends being hinged upon a common fulcrum-rod 22, fixed in the side walls of the base. Pivoted to each lever at 23, about midway between its ends, is a bell-crank lever comprising an upwardly-extending arm 24 and a downwardly and forwardly extending arm 25, the latter being horizontally forked at 26 to engage a common transverse fulcrum-rod 27, which is secured in the base. To the upper end of the arm 24 is pivoted at 28 the rear end of a horizontal link 29, the forward end of which is pivoted at 30 to a type-bar 31. The type-bars are pivoted in series upon a rod 32, which is bent into the form of an arc and suitably fixed in a segment 33, the latter being provided with radial slots 34, the hub of a type-bar being placed in each of said slots. The forward ends of the type-bars normally rest upon a segmental pad 35, which is supported upon the front end of an arm 36, the rear end of the latter being secured to the under side of the segment. The forward end of the type-bar is provided with two types 38, the outer one of which normally strikes the front of the platen. The system of type-bars, together with the segment 33 and the basket 35, may be made vertically shiftable, in order to permit the inner type 38 to print upon the platen, as set forth in my application, Serial No. 719,419, filed June 5, 1899. A returning-spring 40 may be placed under each of the key-levers 20.

A universal bar 41, which extends across under the system of key-levers, is supported by means of vertically-arranged hooks 42 upon branches 43, which are secured to a forwardly-extending horizontal arm 44. The latter, taken together with an upright arm 45, constitutes a dog-rocker frame which is pivoted at 46 to a bracket 47, depending from the under side of the top plate and is provided with a returning-spring 48. To the upper end of the dog-rocker are secured a fixed detent-dog 49 and a limber or feeding-dog 50, the latter being normally in engagement with an escapement-wheel 51, secured upon the rear end of a shaft 52, which is mounted in a bracket 53 and carries at its forward end a pinion 54. The bracket 53 is suitably secured upon the top plate. The carriage is propelled by a spring-barrel 55, which is suitably mounted upon a boss 56, formed upon said bracket 47, and is connected by a cord or strap 57 to an arm 58, secured upon the right-hand end of the paper-carriage. A horizontal escapement-rack 59, extending parallel with the paper-carriage, is arranged in mesh with the upper portion of the pinion 54, and at its ends is secured, by means of screws 60, to bent ears 61, formed upon levers 62, the latter extending forwardly to a point 63, where they are pivoted by screws upon the end bars of the carriage-frame and extending thence forwardly and upwardly, each lever being provided at its front end with a key or finger-piece 64. It will be observed that the rack-bar 59 and the arms 62, taken together, form a bail, Fig. 11, and that when either release-key 64 is depressed the entire frame swings upon the pivots 63, the rack-bar 59 rising out of engagement with the pinion 54 and permitting the carriage to be moved rapidly along in either direction. A spiral spring 65 serves to return the release-bail to normal position, said spring being mounted in a housing 65$^a$, Figs. 2, 3, and 13, secured by screws to the rear side of the slide-bar 9 and operating upon a plunger 65$^b$, the lower end of which bears down upon the upper edge of the bar at a point about midway of its length. Said spring may be adjusted by a screw 65$^c$.

A horizontal margin-stop bar 66 is arranged directly over and parallel with the upper carriage-track 12, said bar being provided with teeth 67 upon its front edge, a scale or series of graduations 68 upon its top surface, and a strengthening-rib 69 upon its under side. The bar is also provided at each end with a journal-block, the latter comprising a pair of jaws 70, which are clamped upon the end of the bar by a screw 71, and a shaft or trunnion 72, which passes through a pivot-hole formed in an ear 73, fixed upon the upper side of the carriage-track bar 12, one of these ears being arranged near each end of said track-bar. To the outer end of each pin 72 is secured a finger-piece or knob 74, by which said margin-gage bar may be given a partial rotation in its bearings. A returning-spring 75 may be coiled about one or both of said journal-pins 72 for restoring the margin-gage bar to normal position, in which position it bears against a stop 76. The journal-blocks fit closely against the inner faces of the ears 73, so as to prevent endwise movement of the margin-gage bar. Adjustably mounted upon said margin-gage bar is a device 77, by which the left-hand margin upon the paper may be regulated. Said adjustable device or gage is a three-sided slide, with forward and rear downwardly and inwardly extending flanges or lips, forming a rectangular box-like structure with a slot from end to end, so that while the gage is properly supported upon said bar it may be moved freely therealong. The box or slide portion 77 is formed upon its top side with an ear or lug 78, which is cut through or slotted vertically at 79 to receive the body portion of a lever 80. Said lever is supported upon a transverse pivot 81, passing through the ear portions and through a hole in the lever. The forward end of the lever is provided with a finger 82, which is adapted to engage with the notches in the front edge of the margin-gage bar, and thus securely hold the device in any position to which it may be adjusted. The top end of said lever is formed with a finger-piece 83, which when depressed causes an oscillation of said lever and a removal of the finger 82 from the notch with which it is engaged, and thus leaves the gage free to be moved to a new position. In a housing formed in the ear 78 is placed a small spiral spring 84, whose upper end is seated in a notch 85 in said lever, and the force of said spring acts on the lever on that side of the pivot opposite the side on which is located the said finger, so that said spring tends always to keep said finger in engagement with the selected notch. When it may be desired to readjust the gage, it is simply necessary to press down upon the finger-piece 83, thus pressing the spring and raising the finger 82 from its notch, and then by a sidewise force upon the lever to push or pull the slide along the bar 66 to the desired position for resetting, whereupon the finger will automatically engage the notch upon releasement of the lever. Said gage is provided in front with a downwardly-extending lug 86, which serves to arrest the carriage when returned for beginning a new line, such arrest being effected by the contact with said lug of the upper end of a vertical lever 87, which is pivoted at 88 to a boss 89, formed upon the forward lower portion of the carriage bar or slide 9, and bears normally under the tension of a spring 90 against a stop-pin 91 on said carriage-bar. By reason of its bearing against said pin 91 the lever 87 is enabled to arrest the carriage when its upper end contacts with the lug 86 upon the said margin-gage. Said lever 87 also operates the bell-striking and line-locking devices, and to this end is provided below its pivot with a bent arm or elbow-piece 92, the angle of the elbow contacting at 93 with the upper edge of a second bar 94, which is parallel with the said margin-gage bar and of slightly-greater length than the lower carriage-track 11. Said bar 94 is provided with rearwardly-extending ears 95, said ears and bar, taken together, forming a bail which is pivoted or hinged to the ends of said bar 11 by means of screws 96. During the travel of the carriage the said elbow 92 rides along the upper edge of said bail, so that whenever the elbow-piece is turned about its pivot or hinge 88 it forces said bail to vibrate downwardly about its axis 96 or in a direction transversely of its length. At a point near its left-hand end the bail is provided with a downwardly and rearwardly curving finger 97, the rear end of which during the movement of the bail about its axis 96 pushes rearwardly an arm 98 of a bell-hammer 99, which is pivoted at 100 to a bracket 101, secured upon the rear side of the carriage-track 11, and thereby lifts said bell-hammer. A bell 102 is arranged below said hammer.

A second sliding device or margin-gage 103 is arranged upon the margin-gage bar 66 and adapted to coact with the said lever 87 of the bell-striking and line-locking mechanism. The device 103 is provided with a locking-lever 83, similar to that of the margin-stop 77 and resembles said stop 77 in other respects, except that the lug 86 is omitted and in place thereof is provided a horizontal arm 104, which extends along said rack-bar toward the right. The right-hand edge or abrupt face of said extension or lug 104 contacts with the upper end of the lever 87, Fig. 7, whenever the carriage has proceeded far enough toward the left to effect such contact. During the subsequent step-by-step movements of the carriage toward the left the upper end of the lever 87 remains in contact with the right-hand edge of the extension 104, while the pivotal screw 88 of said lever moves with the carriage to which it is attached, so that there results a limited vibration of the lever 87 upon said pivot. The vibration of the lever effects a limited downward movement of the bail 94, a forward movement of the finger 97, and an upward movement of the bell-hammer 99. The pivot 88 of the lever 87 of course moves in a right line, and during such movement the upper end of said lever is drawn downwardly along the right-hand edge of the stop 104 until the lowest point of said edge is reached, as indicated in dotted lines at Fig. 7. At this time the bell-hammer is raised to the position indicated in dotted lines at 99ª, Fig. 1. The next movement of the carriage toward the left causes the upper end of the lever 87 to trip off from the lower point of the stop or contact 104, whereupon the spring 90 restores said lever to normal position, releasing the bail 94, which is lifted to normal position by a spring 105, and withdrawing the finger 97, thereby permitting the hammer 99 to fall and strike the bell, so that the operator is notified that the line of writing is nearly completed. Said spring 105 is arranged between the bail 94 and the lower carriage-track 11 and is secured at 106 and 107 to the carriage-track, its right-hand end bearing up against a pin 108, projecting from the rear side of the bar 94. Connected to the said bail 94 is a line-locking hook, which is pivoted by a screw 109 upon a horizontal stud 110, Fig. 1, projecting forwardly from the lower portion of the escapement-wheel bracket 53, said hook consisting of a short horizontal arm 111 and a long downwardly-extending arm 112, having at its lower end a hook portion 113. Upon the free left-hand end of the arm 111 is fixed a horizontal pin 114, which extends forwardly beneath the lower carriage-track 11 and into engagement with a perforation 115, formed in an ear 115ª, extending downwardly from bail 94, said pin normally resting against the lower edge of said perforation, the latter being made of sufficient height to permit play of the pin therein. As the weight of the hook-lever is nearly all upon the left-hand side of the pivot 109 said hook is pressed or given a tendency to swing toward the right, which pressure in practice has been found sufficient to move said lever; but, if desired, a spring 116 may be provided for insuring the prompt movement of the lever, said spring being coiled about the stud 110 and one end thereof being connected to the lever 112 and the other to a fixed part of the machine. The hook 113 is arranged upon the left-hand side of the horizontal bar 44 of the dog-rocker frame (which is reciprocated at every key-stroke) and in position to engage the under side of said arm 44 whenever the arm 112 is swung to the right. It will be observed by reference to Fig. 7 that at the bell-striking operation there is not sufficient downward movement of the bail 94 to permit the hook 113 to swing into engagement with the dog-rocker arm 44, the position of said hook at the moment that the trip-lever 87 escapes from the right-hand edge of the extension 104 being indicated in dotted lines. After the striking of the bell and the return of the trip-lever 87 to an upright position, as above described, the further progress of the carriage causes the upper end of said lever to engage the abrupt face of a contact or stop 117, which is formed upon the slide 103 and extends to a lower point than the stop 104 for the purpose of causing a greater vibration of the trip-lever 87 about its pivot 88 than occurs at the bell-striking operation. Such vibration of the lever causes a greater depression of the bail 94 than that just described, and hence permits a greater movement to the right of the hook-lever and enables the hook 113 to engage the under side of the dog-rocker arm 44, as illustrated at Fig. 10. During the last part of the vibration of the trip-lever the extreme end or tip 118 of the elbow 92 bears upon the upper edge of the bail 94, so as to cause a more rapid movement of said bail, so that the hook 113 may promptly engage the arm 44. The hook, being independently pressed, is not liable to be forced against the side of the arm 44 with undue pressure or to cause the carriage to be prematurely arrested, as would be the case if said hook were positively engaged to the bail 94. The engagement of the hook 113 with the dog-rocker prevents subsequent movement of the latter, and hence prevents the finger-keys 21 from moving the types to the printing-point, while at the same time the right-hand edge of the trip-lever 87 contacts with a stop-pin 119, projecting forwardly from the carriage slide-bar 9, thereby preventing further motion of the carriage. It will be seen that means are controlled by the carriage for preventing movement of the reciprocatory arm 44, and thereby of the finger-keys.

Each of the slides 77 and 103 is beveled at 120 upon its left-hand upper surface, and said edge serves as an index to enable the operator to set the slides to any desired position, said edge upon the slide 77 indicating the point at which the writing will begin and said edge upon the slide 103 indicating the point at which will occur the operation of the line-locking mechanism—that is, the mechanism by which the keys are prevented from moving the types to the printing-point.

The line-spacing mechanism arranged at the left-hand end of the carriage may be briefly described as consisting of a rock-shaft 121, having a U-shaped handle or lever 122 at its forward end, said handle being provided with a hub or collar 123, which is secured by a pin 124 to said shaft. It will be observed that the arm 122 is bent downwardly from said hub and then forwardly and upwardly in the same vertical plane and provided with a finger-piece 122$^a$ at its upper extremity or above its axis of rotation. Said shaft has a spring-actuated driving-pawl 125 at its rear end which is carried by a crank-arm 125$^a$ and is adapted when the rock-shaft is turned to engage with the teeth of the crown ratchet-wheel 126, the latter being secured to the end of the platen, and thereby turn the platen step by step regular distances, the driving-pawl going out of engagement when the line-spacing lever or rock-shaft is released. The platen is held against accidental rotation by means of a detent-roller 127, which is carried by an arm or lever 128, the latter being pivoted at its forward end at 129 to an arm 130, which is suitably secured to a boss 131, extending inwardly from the left-hand end bar 4 of the platen-frame. A coiled compression-spring 132 is seated in a housing in said boss and bears outwardly against said arm 128 at a point about midway between its pivot 129 and the detent-roller 127.

Referring now to the paper-guiding devices, it will be observed that a horizontal shaft or rod 133 extends parallel with the platen from one end bar of the paper-carriage to the other at a point just forward of the carriage slide-bar 9 and nearly on a level with the top of said slide-bar. This rod is rigidly secured at each end to the said carriage end bars 4 5 by means of screws 134. Hinged upon said rod is a pair of depending arms 135, in the lower ends of which is journaled a horizontal shaft 136, upon which are mounted at intervals three pressure-rollers 137, the latter being preferably arranged loosely on said shaft and separated by sleeves 138, although one continuous roller may be used. A bent plate-spring 139 is secured by screws 140 to the lower end portion of each arm 135. One end of each of said springs extends forwardly and at its free end is provided with a bearing 141 for the end of a second shaft 142, which likewise carries at intervals three pressure-rollers 143, which may be arranged loosely upon said shaft and spaced or separated thereon by sleeves 144. The other end of said spring 139 extends upwardly and rearwardly and its free end bears against the lower portion of a collar or sleeve 145, which is secured by a screw 146 upon the shaft 133. A transverse cut is made in the said collar 145 equal in width to an arm 135, and when assembling the machine said arm is placed in the said opening in the collar and the shaft 133 passed through the whole, so that the collar after being secured upon the shaft by the screw 146 serves not only as a bearing for the free end of the spring 139, but also to prevent movement of said arm 135 along the shaft. It will be observed that the first-mentioned pressure-rollers 136 are arranged at the rear lower portion of the platen and in convenient position for receiving the leading edge of the paper and that the rollers 143 are arranged at the forward lower portion of the platen, so that rolling pressure may be maintained upon the paper until the latest possible moment, thereby insuring its true feed around the platen. The spring 139 serves to press the roller system 143 against the platen to a certain extent independently of the roller system 137—that is to say, the leading edge of a sheet of paper or the leading edge of a pile of sheets may force the pressure-roller 137 slightly away from the platen without causing the pressure-roller 143 to move out of contact with the platen, owing to the resiliency of the spring 139. Another long horizontal rock-shaft 147 is journaled at 148 in said carriage end bars 4 5 at a point lower than and forward of the shaft 133 and a short distance in rear of the platen. This shaft projects slightly beyond the left-hand carriage-bar 4, and secured to the projecting portion, by means of a hub or collar 148$^a$, is an upwardly-extending finger-lever 149, by which said shaft may be rocked. To prevent endwise displacement of said rock-shaft, a collar 150 is secured thereto just inside of said end bar 4. At a point just forward of each of the pressure-roll arms 135 said rock-shaft 147 is provided with a tappet 151, extending diagonally downwardly and forwardly, and just in rear of said tappet each of the arms 135 is provided with a forwardly-extending projection 152, with which said tappet normally contacts. A forward movement of the finger-lever 149 causes the shaft 147 to rock and the tappet 151 thereon to force rearwardly the projection 152 and the arm 135 against pressure of the spring 139, thereby forcing the pressure-rollers 137 and 141 out of engagement with the platen, as indicated at Fig. 14, and permitting either a free adjustment of the paper upon the platen or an easy insertion of a pile of sheets between the platen and the pressure-rollers 137, as the case may be.

A sheet-metal apron or deflector 153, curved to nearly fit the curvature of the platen and provided with openings 154 for the pressure-rollers 137, is loosely hung upon the rock-shaft 147 by means of a pair of blocks or collars 155, to which it is secured by means of bent fingers 156, which pass behind said blocks 155 and are riveted thereto. Endwise movement of the apron is prevented by means of collars 157, secured upon said shaft just outside of the blocks 155, only one of said collars being shown, Fig. 2. The openings for the rollers 143 are made in the form of cutaways or notches formed in the front edge of the apron 154$^a$, so as to leave no metal upon which the leading edge of the paper can catch when passing around the platen. Moreover, the provision of notches or cut-aways at this point enables the apron to be more readily bent into shape and thereafter to better retain its shape than would be the case if rectangular perforations similar to 154 were left at this point for the pressure-rollers 143, particularly if the edges of said openings were bent downwardly and upwardly to form lips, such as those illustrated in Fig. 14 at 154$^b$. The said apron is normally supported in contact with the platen, or independently spring-pressed against the platen, by means of plate-springs 158, the rear end of each of which is secured by the screw 140 to the arm 135 and the forward ends of which bear up against the under side of said apron, as illustrated at Figs. 1 and 14. It will be understood, of course, that said springs 158 are much weaker than the springs 139, as it is not necessary that there should be much pressure between the apron 153 and the platen.

The platen-scale is designated as 159 and is secured to the upper end of a pair of arms 160, which are pivotally supported or hinged by shoulder-screws 163 upon horizontal studs 161, projecting inwardly from legs 162, formed upon the carriage end bars 4 5. Springs 164 may be coiled about each of said studs and adapted to press said platen-scale lightly against the platen or the paper thereon. The legs 162 extend downwardly and forwardly to such a point as that the upper edge of the platen-scale may swing out from the platen in a line or arc 159$^a$, Fig. 1, which is substantially radial to the axis of the platen, so that said scale is always found to be reliable for adjusting the paper whether one sheet or a pile of sheets be inserted in the machine.

A horizontal shaft 165, arranged just over the platen, is journaled at 166 in the side plates 4 5 and provided with a longitudinal groove 167. Arranged upon this shaft are two sliding collars 168, each of which is splined to said groove and to the under side of each of which is secured a yielding finger 169, which extends downwardly around the front of the platen and overlaps the upper edge of the platen-scale. The fingers 169 are intended to press lightly against the platen or the paper thereon. To this end a spring 170 may be coiled about the shaft, one end being secured to the shaft and the other end to the end bar 5 of the platen-frame. Also splined to said shaft is a paper-guide 171, which may be arranged at about the central portion of the shaft and is bent outwardly at its lower end, so as to make a flaring opening for the passage of the leading edge of the paper between said guide and the platen.

The paper-shelf is designated as 172 and is detachably hinged upon the shaft 133 by means of clutches 173, to which said paper-shelf is secured by rivets 174. Each of said clutches is formed with a laterally-extending boss or hub 175, which is bored to form an opening for the shaft and which is also cut away or notched at 176 upon its under side. A long slit 177 is also made in the body of said clutch, intersecting the upper part of said hub or boss, so as to enable the rear portion of said clutch to yield slightly. By means of this construction the paper-shelf may be pulled up off from the shaft 133 or replaced in position thereon, the pressure of the clutch being sufficient to hold the paper-shelf firmly in place upon the shaft. The said clutch serves also as a hinge by which the paper-shelf may be given a partial rotation forwardly or in a direction transversely of its length upon the shaft or hinge rod 133, as indicated in dotted lines at Fig. 1, whereby free access is had to the margin-gage bar 66 and the sliding devices thereon, the paper-shelf being arranged just forward of said margin-gage bar and curving rearwardly thereover.

The upper edge of the paper apron or deflector 153 is curved rearwardly, so as to avoid catching the leading edge of a sheet of paper which is being inserted into the machine, Fig. 1, while the lower edge of the paper-shelf is likewise bent rearwardly, so as to avoid catching the final edge of a sheet of paper whenever the movement of the latter is reversed in the machine by the backward rotation of the platen.

A paper-support or paper-shelf extension is detachably secured to the paper-shelf 172, the said support being made, preferably, of a single piece of wire, its main portion 178 extending upwardly and rearwardly and preferably being bent into inverted-U shape at 178. Prongs 179 are formed at the lower end of the support, the wire being bent or folded back upon itself in order to stiffen the prongs, and the ends of the wire are then bent inwardly at 180, so as to aline with each other, and are permanently secured by a sleeve 181, which may be soldered to the wire, thus forming a very cheap and efficient construction. A strip 182 is secured to the under side of the overhanging portion of the paper-shelf by means of rivets 183, placed at about the center of said strip. The latter extends longitudinally of the paper-shelf and at its ends is bent or fluted crosswise at 184, so as to form an opening or pocket in which may be inserted the prongs 179 of the wire extension, which are curved to match the curve of this portion of the paper-shelf. The strip 182 is sufficiently strong to press the prongs 179 firmly up against the under side of the paper-shelf, so that the extension is held firmly in position, while it may be readily slipped out rearwardly and readily replaced. This extension is especially useful, inasmuch as it enables the operator to inspect any portion of the written page without reaching back to lift the advance edge of the paper, as will be understood by reference to Fig. 8. Said wire, however, does not interfere with swinging forward the paper-shelf to give access to the adjustable margin-regulating and line-locking devices.

Referring now to Figs. 9 and 11, the upper carriage-track is provided at a point about midway of its length with a rearwardly-extending ear 185, through which passes downwardly a screw 186, the lower end of which engages a threaded hole formed in the upper end of an arm 187, that extends upwardly from the escapement-wheel bracket 52$^a$. The purpose of this device is to correct any warp or bow which may occur in the upper carriage-track by reason of the pressure of the bearing-balls 14, which is liable to occur, for the reason that the track is supported by two horizontally-placed screws 16. The said screw 186 is provided with a lock-nut 188 to hold it in any position to which it may be adjusted. For the purpose of straightening or adjusting the lower rail, a screw 189 is inserted upwardly into a threaded hole formed about centrally upon the under side of said rail, the head of said screw bearing upon the top plate 17 of the machine and being provided with holes 190, into which a tool may be inserted to rotate said screw. By means of the two screws 186 and 189 said rails may be brought into exact parallelism for their entire length and a perfect fit of the balls in the grooves may be secured, enabling the carriage to run freely without vibration.

In operation the paper-shelf is swung forwardly to the dotted-line position shown at Fig. 1 to give access to the margin-controlling devices. The lever 83 upon the slide or gage 77 is depressed to release said slide, and the latter is then moved along the margin-gage bar 67 until the left-hand bevel edge 120 of the slide coincides with that graduation upon said bar which indicates the point at which it is desired the lines of writing shall begin. Said lever 83 is then released and the slide locked at such position. Then the slide 103 is similarly manipulated until the left-hand beveled edge thereof coincides with that graduation upon said bar which corresponds to the point in the line of writing at which it is desired the type-keys shall be locked, whereupon the lever 83 is released to lock said slide in its adjusted position. Then the paper-shelf is swung back to normal position and a sheet of paper is inserted in the machine, its leading edge passing down behind the platen and between the latter and the paper-apron 153 until said leading edge enters between said platen and the rear pressure-rollers 137. In the case of manifolding if the pile of sheets is too thick to enter readily between the platen and the pressure-roller the release-lever 149 may be pressed forwardly, causing its shaft 147 to rock and the tappets 151 thereon to press rearwardly the projections 152 and the hinged arms 135, which carry said pressure-rollers, thus enabling said pile of sheets to be readily passed between the platen and said rollers, whereupon the release-lever 149 may be allowed to return to normal position and the paper will be firmly bitten between the platen and the rollers. The platen is then rotated in the usual manner, and said sheet or sheets are carried around between the platen and the deflector 153 and upon reaching the front pressure-rollers 143 are also bitten between said rollers and the platen, thus insuring a true feed of the paper. Further rotation of the platen causes the paper to advance upwardly between the platen and the platen-scale, the latter readily yielding outwardly to permit passage of the paper. At this time the leading edge of the paper may be compared with the top edge of the platen-scale, and if found not parallel therewith it may be adjusted to bring its leading edge true to the scale. In order to effect such adjustment, the release-lever 149 may be again manipulated so as to relieve the paper of the pressure of the rollers 137 and 143. Upon further rotation of the platen the paper passes up between said platen and the front guide-fingers 169 and 171, the latter serving to prevent the leading edge of the paper from bowing or bellying unduly at the center. All of said guide-fingers may be adjusted along the grooved rod 165 to accommodate any width of paper. Either of the release-keys 64 may now be depressed, so as to lift the rack-bar 59 from the pinion 54 and enable the carriage to be moved freely in either direction to the point at which it is desired to begin the writing of the first line. Then the finger-keys 21 may be depressed in succession, forcing down one at a time the key-levers 20 and the bell-crank levers 24, pivoted thereon, and causing the upper end of said bell-cranks to swing rearwardly, owing to the engagement of the slot 26 thereon with the fixed fulcrum-rod 27. By means of the link 29 the type-bar is swung up to print, and at the same time the universal bar 41 is depressed and through the hooks 42 and branches 43 pulls down the arm 44 of the dog-rocker and causes the vertical arm 45 thereof to swing forwardly, so that the limber dog 50 escapes from the escapement-wheel and the detent 49 engages therewith. The finger-key 21 is now released, permitting the key-lever and type-bar to return to normal position, as well as the universal bar and dog-rocker, under the tension of the returning-springs 40 and 48. During this movement of the dog-rocker the detent 49 escapes from the wheel 51, permitting the latter to advance one tooth in a well-known manner, and hence permitting the advance movement of the carriage for one letter-space under the tension of the spring-drum 55. As the keys are manipulated the carriage advances accordingly until it reaches the position indicated in full lines at Fig. 7, at which time the upper end of the trip-lever 87 contacts with the right-hand edge of the projection 104 upon the bell-ringing and line-locking slide 103. Subsequent operation of the keys is accompanied by further advance movement of the carriage until the parts assume the position shown in dotted lines at Fig. 7, at which time the bar 94 has been forced downwardly to a limited extent by the elbow 92, and the bell-hammer has accordingly been swung by the finger 97 to the dotted-line position 99ª at Fig. 1. Subsequent advance movement of the carriage enables the lever 87 to slip out of engagement with the working edge of the extension 104, whereupon said lever and the bail or bar 94 are returned instantly to normal position by the springs 90 and 105, thus permitting the bell-hammer 99 to fall and strike the bell to notify the operator that the end of the line is nearly reached. Subsequent manipulation of the keys permits the carriage to advance to a position where the lever 87 is engaged by the lug 117 upon the slide 103, and the said lever is consequently vibrated until the bar 94 and hook-lever 112 assume the positions shown at Fig. 10, at which time the hook or intercepting device 113 engages the under side of the arm 44 of the dog-rocker, thus preventing movement of the types to the platen, while the lever 87 engages the pin 119 upon the carriage, thus preventing further movement of the latter. The carriage may now be returned to begin a new line, thus enabling the line-locking mechanism to resume normal or inoperative position. Should it be desired, however, to first write one or more additional letters to complete a word or syllable at the end of the line just written, either of the finger pieces or knobs 74 may be rotated so as to cause a partial rotation of the margin-stop bar 66, whereby the lug 117 is raised out of engagement with the lever 87, as indicated by dotted lines at Fig. 13. Thereupon said lever, together with the bar 94 and the arm 112, resumes normal position. The finger-key 74 may then be released and the finger-keys 21 manipulated until the carriage is finally arrested by contact of the lever 87 with a stop-pin 191, projecting from the upper carriage-track 12, it being understood that said lever when in contact with said stop 191 is vibrated to the same extent, as indicated at Fig. 10, thus causing the key-levers to be finally locked. To begin a new line, the lever 122 may be first pressed toward the left, thereby giving the platen a partial rotation through the line-space pawl 125 and simultaneously moving the carriage back to begin a new line, both operations being conveniently performed by a single sweeping movement of the left hand. During such movement of the carriage the trip-lever 87 engages one at a time the sloping or oblique edges of the lugs or projections 117 and 104 and in each instance by a lifting or camming action causes a partial rotation of the margin-gage bar 66 upon its trunnions 72, enabling the lever to pass the stops, said bar being in each instance restored to normal position by spring 75. The carriage is finally arrested by contact of said trip-lever 87 with the abrupt abutment 86 upon the margin-gage slide 77, whereupon the writing of a new line may be begun. If at any time it is desired to write in the left-hand margin upon the paper, the margin-gage bar 66 may be rotated, causing the abutment 86 to rise above the top of the lever 87, whereupon the carriage may be pushed to the left until said lever is arrested by a stop-pin 192. Words may then be written in the margin, the carriage moving to the left freely and the trip-lever 87 yielding when engaged by the right-hand edge of the abutment 86. This limited yielding or vibration of the lever, Fig. 10, causes the bar 94 to be swung downwardly to the dotted-line position shown at Fig. 7, and as soon as said lever escapes from the abutment 86 the bell is caused to ring in the hereinbefore-described manner, thus notifying the operator that the margin is filled, or, in other words, that no more can be written in the margin.

Referring to Figs. 10 and 17, a lever 193 is pivoted at 194 beneath the top plate 17 and extends horizontally to the front of the machine, where it is provided with a key 195, projecting up through a hole in the top plate. Said lever is provided at its rear end with an upwardly-directed arm 196, carrying at its upper end a lateral pin 197, which engages forks 198, formed in the lower end of an arm 199, secured to the left-hand trunnion or pintle 72 of the margin-gage bar 66. Depression of the key end of the lever causes the arm 196 to swing forwardly, and by means of the pin 197 the arm 199, pintle 72, and bar 66 are rocked to a position to release the carriage and type operating keys, as indicated in dotted lines at Fig. 13. Either the key 195 or one of the milled finger-pieces 74 may be operated for this purpose, as may be most convenient for the operator at the moment.

It will be observed that the track-bars 11 12 serve to wholly support and guide the slide-bar 9 and that the cylindrical platen 1 is confined between and wholly supported by the forwardly-extending arms 4 5, which are rigidly connected to said slide-bar. The said slide-bar and end bars taken together form an overhanging carriage—that is, one whose supporting and guiding devices are arranged wholly in rear of the platen. This arrangement permits the carriage-frame to be open in front, thereby affording an unobstructed view of the writing and permitting free access to the platen for the purposes of adjusting the paper, making corrections, &c. At the same time it will be noted that the carriage-frame as a whole is exceedingly compact, which is a feature of importance in this class of machines, and also that the weight of the same is very much reduced. At the same time the carriage-frame is sufficiently stiff to prevent distortion, while it is rigidly guided without interfering with its free movement, so that the machine may be operated rapidly without impairing the alinement of the writing.

While I have shown one carriage-track as arranged above the other, still this arrangement is not essential in all the forms in which my invention may be carried out, and while I have shown my improvements as adapted to a front-strike writing-machine it is obvious that portions of said improvements may be adapted to machines of other kinds. Various changes may be made in detail construction and arrangement within the scope of the invention.

What I claim as new, and desire to secure by Letters Patent, is as follows:

1. In a type-writing machine, the combination of a slide-bar, a pair of track-bars, grooves formed in said slide-bar and said track-bars, rollers arranged in said grooves and serving to wholly support and guide said slide-bar, forwardly-extending arms rigidly secured to said slide-bar, and a cylindrical platen wholly supported by and confined between said forwardly-extending arms.

2. In a type-writing machine, the combination of a slide-bar, a trackway whereby said slide-bar is wholly supported and guided, forwardly-extending arms rigidly secured to said slide-bar, and a cylindrical platen carried by and confined between said forwardly-extending arms, said arms and platen being wholly supported by said slide-bar and trackway.

3. In a type-writing machine, the combination of a U-frame open in front and comprising parallel end bars united by a longitudinally-extending slide-bar provided upon its upper and lower edges with grooves, track-bars arranged above and below said slide-bar and also provided with grooves, rollers arranged in said grooves whereby said U-frame is wholly supported and guided, and a platen wholly supported by said end bars in front of said slide-bar.

4. In a type-writing machine, the combination with a cylindrical platen of an overhanging platen-frame, consisting of end bars in which said platen is journaled and a slide-bar arranged in rear of said platen and rigidly uniting said end bars, a groove formed longitudinally in said slide-bar, a supporting and guiding carriage-track formed with a groove to match said slide-bar groove, rollers arranged in said grooves, whereby said slide-bar is supported upon said track, and means engaging said slide-bar for holding the latter upright and guiding the same.

5. In a type-writing machine, the combination with a cylindrical platen of an overhanging platen-frame, consisting of end bars in which said platen is journaled and a slide-bar arranged in rear of the said platen and rigidly uniting said end bars, a groove formed longitudinally in each of the under and top edges of said slide-bar, grooved tracks arranged above and below said slide-bar, and rollers arranged in the ballways formed by said grooves.

6. In a type-writing machine, the combination with a platen and a platen-frame, of an escapement-rack, and a lever rigidly secured to said rack at each end thereof, each of said levers being pivoted between its ends upon the platen-frame and bearing at its forward end a finger-piece, and said levers and rack taken together forming a single swinging frame or bail which vibrates upon said lever-pivots, so that either of said finger-pieces may be manipulated to release said rack from the carriage escapement devices.

7. In a type-writing machine, the combination with a platen and a platen-frame, of a rack, an escapement-controlled pinion in mesh therewith, a lever rigidly secured to said rack at each end thereof, each of said levers being pivoted to the platen-frame and bearing at its forward end a finger-piece, and said levers and rack taken together forming a single swinging frame or bail so that either of said finger-pieces may be manipulated to release said rack from the pinion, and a spiral spring and a plunger for returning said frame or bail to normal position, said spring and plunger being arranged in a housing fixed upon the platen-frame, and said plunger bearing down upon the upper edge of said rack-bar.

8. In a type-writing machine, the combination with a platen and a platen-carriage including a slide-bar, of means for supporting and guiding said slide-bar, said supporting and guiding means including a track arranged over said slide-bar, a margin-gage bar supported over said track and parallel therewith, a margin-controlling device adjustable to various positions along said bar; and means upon the said platen-carriage for engaging said adjustable device.

9. In a type-writing machine, the combination with a platen and a platen-carriage including a slide-bar, of means for supporting and guiding said slide-bar, said supporting and guiding means including a track arranged over said slide-bar, and a margin-gage bar supported over said track and parallel therewith, said margin-gage bar being provided with graduations upon its top surface and with a strengthening-rib extending along its lower surface, teeth cut upon one edge of said bar, a margin-controlling device adjustable along said bar, locking means arranged upon said adjustable device for engaging said teeth, and means arranged upon the platen-carriage for engaging said adjustable device.

10. In a type-writing machine, the combination with a paper-carriage of a margin-gage bar, a journal-block secured upon each end of the bar, each of said blocks being provided with trunnions, fixed supports in which said trunnions are journaled, a margin-controlling device constructed for adjustment along said bar, and means upon the carriage for engaging said adjustable device.

11. In a type-writing machine, the combination with a paper-carriage including a slide-bar, of a carriage track-bar arranged over said slide-bar, ears fixed upon said track-bar, a margin-gage bar journaled in said ears, a margin-controlling slide constructed for adjustment along said margin-gage bar, and means upon the carriage for engaging said slide.

12. In a type-writing machine, the combination with a carriage, of a journaled margin-gage bar, a device carried by and adjustable along said bar, mechanism constructed to coöperate with said adjustable device for controlling the margin upon the written page, and a finger-piece secured to said margin-gage bar, whereby the latter may be given a partial rotation so as to effect a disengagement between said adjustable devices upon said bar and said coöperative mechanism.

13. In a type-writing machine, the combination with a carriage, of a margin-gage bar provided with trunnions, suitable supports in which said trunnions are journaled, at least one of said trunnions being extended beyond its support and provided with a finger-piece, a carriage-contact, and an adjustable margin-controlling device carried by said bar and releasable from the carriage-contact by the rotation of said bar.

14. In a type-writing machine, the combination with a carriage, of a margin-gage bar provided with trunnions, suitable supports in which said trunnions are journaled, at least one of said trunnions being extended beyond its support and being provided with a finger-piece, a returning-spring, and an adjustable margin-controlling device carried by said bar.

15. In a type-writing machine, the combination with a carriage, including a slide-bar, of a track-bar arranged above said slide-bar and provided with ears, a margin-gage bar provided with trunnions and journaled in said ears, each of said trunnions being extended beyond said ears, a finger-piece secured to each of said extensions, an adjustable slide carried by said bar, and means arranged upon said carriage for engaging said slide.

16. In a type-writing machine, the combination with a carriage, of a journaled margin-gage bar, a device carried by and adjustable along said bar, mechanism constructed to coöperate with said adjustable device for controlling the margin upon the written page, a finger-piece secured to said margin-gage bar, so that the latter may be given a partial rotation so as to effect a disengagement between the adjustable device upon said bar and said coöperative mechanism, a returning-spring for said bar, and a stop for limiting the rotation of said bar under the tension of said spring.

17. In a type-writing machine, the combination with a carriage, of an endwise-immovable journaled bar of the margin-gage and line-locking mechanism, an adjustable margin-controlling device arranged on said bar, means for rotating said bar to effect a release of the carriage, and a returning-spring.

18. In a type-writing machine, the combination with a platen-carriage, including a slide-bar, of means, including a track arranged over said slide-bar, for supporting and guiding the carriage, a bar supported over said track and parallel therewith, a contact adjustable upon the last-mentioned bar, and a bell striking mechanism including a device arranged upon said carriage and adapted to engage said adjustable contact.

19. In a type-writing machine, the combination of a carriage, a lever fulcrumed upon said carriage, a contact or stop arranged in the path of said lever and adjustable in the direction of movement of said carriage, whereby upon engagement of said stop and said lever at any point in the advance movements of said carriage, the said lever is caused to turn upon its fulcrum by reason of the movement of the carriage, and a bell striking mechanism on the framework of the machine constructed to be operated by said lever during the turning movement thereof, at any point in the travel of said carriage at which said adjustable stop may cause said lever to turn.

20. In a type-writing machine, the combination of a carriage, a lever fulcrumed upon said carriage, a contact or stop arranged in the path of said lever, whereby upon engagement of said stop and said lever the latter is caused to turn upon its fulcrum by reason of advance movement of the carriage, and a bell striking mechanism, including a bar arranged parallel with the line of movement of said carriage and constructed to be moved by said lever during the turning movement of the latter.

21. In a type-writing machine, the combination of a carriage, a device arranged upon said carriage and movable independently thereof, a contact or stop arranged in the path of said independently-movable device, whereby upon engagement of said stop and said device the latter is caused to move independently upon said carriage during and by reason of the advance movements of the latter, and a bell striking mechanism constructed to be operated by said device during such independent movement thereof.

22. In a type-writing machine, the combination of a carriage, a device arranged thereon and movable independently thereof, a contact or stop arranged in the path of said independently-movable device, whereby upon engagement of said stop and said device the latter is caused to move independently upon said carriage during and by reason of the advance movements of the latter, a bell striking mechanism constructed to be operated by said device during such independent movement thereof, and a spring for restoring said independently-movable device to normal position.

23. In a type-writing machine, the combination of a carriage, a trip-lever fulcrumed thereon, a contact or stop arranged in the path of said trip-lever, the construction and arrangement being such that upon engagement of said stop and said trip-lever the latter is caused by reason of the advance movements of the carriage to first turn upon its fulcrum and to then trip off from said stop, a bell-hammer, and connections between said bell-hammer and said trip-lever, whereby during the engagement of said trip-lever with said stop the said bell-hammer is moved away from the bell, and at the tripping action of said lever the said bell-hammer is permitted to strike the bell.

24. In a type-writing machine, the combination of a carriage, a trip-lever pivoted thereon, an adjustable contact or stop arranged in the path of said trip-lever, a movable bar arranged parallel with the direction of the carriage travel, and a bell-hammer operated by said movable bar, the construction and arrangement being such that during the advance movements of said carriage the said trip-lever is caused to turn upon its pivot by reason of contact with said stop, so as to move said bar and said bell-hammer, and being further such that when said trip-lever subsequently trips off from said stop, said bar is enabled to resume normal position and said bell-hammer is enabled to strike.

25. In a type-writing machine, the combination with a carriage, including a slide-bar, of carriage-tracks arranged above and below said slide-bar, a margin-gage bar arranged over said upper track, a contact adjustable upon said margin-gage bar, a vertically-arranged lever pivoted upon said carriage slide-bar and constructed to engage by its upper end said contact, a bar arranged below said lever and extending parallel with said carriage-tracks and provided at its ends with ears, whereby it is pivoted to the ends of said lower track, said pivoted bar being operable by said vertical lever at any point in the travel of said carriage determined by the adjustment of said contact, and a bell striking device operated by said pivoted bar.

26. In a type-writing machine, the combination with a carriage, including a slide-bar, of carriage-tracks arranged above and below said slide-bar, a margin-gage bar arranged over said upper track, a contact adjustable upon said margin-gage bar, a vertically-arranged lever pivoted upon said carriage slide-bar and constructed to engage by its upper end said contact, a bar arranged below said lever and extending parallel with said carriage-tracks, and provided at its ends with ears whereby it is pivoted to the ends of said lower track, said pivoted bar being operable by said vertical lever at any point in the travel of said carriage determined by the adjustment of said contact, a bell striking mechanism operated by said pivoted bar, and a spring for returning said pivoted bar to normal position.

27. In a type-writing machine, the combination with a carriage, including a slide-bar, of carriage-tracks arranged above and below said slide-bar, a margin-gage bar arranged over said upper track, a contact adjustable upon said margin-gage bar, a vertically-arranged lever pivoted upon said carriage slide-bar and constructed to engage by its upper end said contact, a bar arranged below said lever and extending parallel with said carriage-tracks and provided at its ends with ears, whereby it is pivoted to the ends of said lower track, said pivoted bar being operable by said vertical lever at any point in the travel of said carriage determined by the adjustment of said contact, a finger upon said pivoted bar, and pivoted bell-hammer constructed to be engaged by said finger.

28. In a type-writing machine, the combination with a carriage of two bars arranged parallel with the direction of the movement of said carriage, an adjustable device arranged upon one of said bars, a bell-hammer operatively connected to the second of said bars, and means connected to the carriage and controlled by said adjustable device for moving said second bar and thereby operating said bell-hammer.

29. In a type-writing machine, the combination with a carriage of two bars arranged parallel with the direction of movement of said carriage, an adjustable device arranged upon one of said bars, a bell striking device connected to the second of said bars, and a lever pivoted upon the carriage and extending from the first to the second bar and constructed to engage said adjustable device during the advance movements of the carriage and to be thereby turned upon its pivot and caused to operate said second bar.

30. In a type-writing machine, the combination with a carriage of a journaled margin-gage bar, a device adjustable along said bar, a bell striking device, a lever pivoted upon said carriage, said lever being constructed to be engaged by said adjustable device and to be thereby turned upon its pivot during the advance movements of the carriage, and means for enabling said lever to operate said bell striking device, said lever being also constructed to escape from said adjustable device during the subsequent advance movements of the carriage, and said adjustable device being enabled, by reason of the movement of said margin-gage bar upon its axis, to yield when engaged by said lever during the return movements of the carriage.

31. In a type-writing machine, the combination with a carriage, of a bar parallel therewith, bell striking means operated by said bar, and a lever upon the carriage adapted to directly engage said bar and move the same crosswise at variable predetermined points in the advance movement of the carriage.

32. In a type-writing machine, the combination with a carriage, of a bell-striking mechanism, a contact adjustable along the line of travel of the carriage, and a two-arm lever pivoted upon the carriage, one arm of said lever being adapted to engage said adjustable contact and the other arm thereof being constructed to operate the bell striking mechanism.

33. In a type-writing machine, the combination with a carriage, of a contact adjustable along the travel of the carriage, a rocker-bar parallel with the carriage, bell striking means operated by said rocker-bar, and means upon the carriage between said adjustable contact and said rocker-bar for engaging the latter and causing it to rock.

34. In a type-writing machine, the combination with a carriage and a bell striking mechanism, of a lever mounted upon the carriage and constructed by its vibration to operate said bell striking mechanism, and means for causing said lever to vibrate at variable predetermined points in the travel of the carriage.

35. In a type-writing machine, the combination with a carriage having a vertically-arranged pivoted lever, of a bar arranged above said carriage and carrying an adjustable contact adapted to actuate said lever, a bar arranged below said carriage and parallel therewith and adapted to be actuated by said lever, and bell striking devices operated by said second bar.

36. In a type-writing machine, the combination with a carriage of two rocker-bars, a bell striking device operated by one of said bars, a contact adjustable along the second of said bars, and a device upon the carriage constructed to rock the first bar when engaged by said adjustable contact during the advance movement of the carriage and also constructed to rock the second bar when engaging said contact during a return movement of the carriage.

37. In a type-writing machine, the combination with a carriage, of a bar parallel therewith, a bell striking device operated by said bar, a contact supported independently of said bar and adjustable along the travel of the carriage and provided with an abrupt face and an oblique face, and a device upon the carriage adapted to engage the abrupt face of said contact during the advance movement of the carriage and to be thereby enabled to move said bar crosswise to cause the bell to ring, said device on the carriage being also constructed to engage the oblique face of said contact and force the latter out of its path during the return movement of the carriage.

38. In a type-writing machine, the combination with a carriage and a bell striking mechanism, of a pivotally-supported lever upon the carriage, and a pivotally-supported contact therefor arranged upon the frame of the machine, said pivotally-supported lever being constructed to be turned upon its pivot by said contact during the advance movement of the carriage and to cause the bell to ring, and said pivotally-supported contact being constructed to turn upon its pivot during a return movement of the carriage to permit the passage of said pivotally-supported lever.

39. In a type-writing machine, the combination of a carriage, lever 87 fulcrumed thereon, adjustable contact 104, and a bell striking mechanism including bail 94.

40. In a type-writing machine, the combination of carriage slide-bar 9, tracks 11 and 12 arranged above and below the slide-bar, bar 66, contact 104 adjustable thereon, spring-actuated lever 87 pivoted upon the slide 9, rocker-bar 94 arranged below said lever, ears provided upon said bar 94, whereby it is pivoted to the lower track 11, and a bell striking device operated by the bar 94.

41. In a type-writing machine, the combination with a carriage, of bar 94, an adjustable contact 104 having an abrupt working face and an oblique or beveled face, a lever pivoted to the carriage and comprising both an arm 87 for engaging said contact and an arm 92 for engaging said bar 94, spring 90, stop 91, and bell striking devices connected to the latter.

42. In a type-writing machine, the combination of a series of types, operating-keys therefor, a carriage, a lever fulcrumed upon said carriage, a stop arranged in the path of said lever and adjustable in the direction of movement of said carriage, whereby upon engagement of said stop and said lever at any point in the advance movements of said carriage the said lever is caused to turn upon its fulcrum by reason of the movement of the carriage, and means for preventing the keys from moving the types to the printing-point, said means being constructed to be operated by said lever during said turning movement thereof at any point in the travel of said carriage at which said adjustable stop may cause said lever to turn.

43. In a type-writing machine, the combination of a series of types, operating-keys therefor, a carriage, a lever fulcrumed upon said carriage, an adjustable stop arranged in the path of said lever, whereby upon engagement of said stop and said lever the latter is caused to turn upon its fulcrum by reason of the advance movement of the carriage, and means for preventing said keys from moving said types to the printing-point, said means including a bar arranged parallel with the line of movement of said carriage and constructed to be moved by said lever during the turning movement of the latter.

44. In a type-writing machine, the combination of a series of types, operating-keys therefor, a carriage, a device arranged upon said carriage and movable independently thereof, a stop arranged in the path of said independently-movable device, whereby upon engagement of said stop and said device the latter is caused to move independently upon said carriage during and by reason of the advance movements of the latter, and means for preventing said keys from moving said types to the printing-point, said means being constructed to be operated by said device during such independent movement thereof.

45. In a type-writing machine, the combination of a series of types, operating-keys therefor, a carriage, two bars arranged parallel with the direction of movement of said carriage, an adjustable stop arranged upon one of said bars, means connected to the second of said bars for preventing said keys from moving said types to the printing-point, and means connected to the carriage and controlled by said adjustable stop for moving said second bar and thereby preventing movement of the types to the printing-point.

46. In a type-writing machine, the combination with a series of types, operating-keys therefor, a carriage, and an escapement mechanism for said carriage, including a pivoted dog-rocker having a vertical dog-carrying arm and a horizontal arm, whereby said rocker is operated by said keys, of a depending hook pivoted upon the framework in proximity to said horizontal dog-rocker arm, and normally tending toward said rocker-arm, and means for enabling said hook to engage said horizontal arm and thereby prevent operation of said dog-rocker and said keys.

47. In a type-writing machine, the combination with a series of types, operating-keys therefor and a carriage, of a device constructed to be reciprocated at every key-stroke, and means controlled by the carriage for preventing the movement of said reciprocatory device and thereby of said keys, said means being normally spring-pressed toward said reciprocatory device, the construction and arrangement being such that during the advance movements of said carriage said means are permitted to move automatically into engagement with said reciprocatory device to prevent movement thereof and of said keys.

48. In a type-writing machine, the combination with a series of types, operating-keys therefor and a carriage, of a movable bar arranged parallel with the travel of said carriage, an intercepting device connected to said bar and extending to a part constructed to reciprocate at each motion of the keys, a lever pivoted upon the carriage and constructed to operate said bar at various points in the travel of the carriage, and means for causing a movement of said lever upon its pivot, so as to move said bar and said intercepting device and thereby prevent operation of said reciprocatory part and of said keys.

49. In a type-writing machine, the combination with a series of types, operating-keys therefor, and a carriage, of a bar movable in a direction transversely of its length, means connected to said bar and operated during said transverse movement thereof for preventing said keys from moving said types to the printing-point, said bar being arranged parallel with the carriage and adjacent thereto, and extending for substantially the whole length of the carriage travel, and means upon said carriage for operating said bar at varying predetermined points in the travel of the carriage.

50. In a type-writing machine, the combination with a series of types, operating-keys therefor, and a platen-carriage, including a slide-bar, of means including a track arranged over said slide-bar, for supporting and guiding the carriage, a bar supported over said track and parallel therewith, a stop adjustable upon the last-mentioned bar, and a line-locking mechanism, including a device arranged upon said carriage and adapted to engage said adjustable stop.

51. In a type-writing machine, the combination with a series of types, operating-keys therefor, and a carriage, of a device arranged upon the carriage and movable independently thereof, a stop arranged in the path of said independently-movable device, whereby upon engagement of said stop and said device the latter is caused to move independently of said carriage by reason of the advance movements of the latter, means constructed to be operated by said device during such independent movement thereof for preventing said keys from moving the types to the printing-point, and a spring for restoring said independently-movable device to normal position.

52. In a type-writing machine, the combination with a series of types, operating-keys therefor, and a carriage, of a lever fulcrumed upon the carriage, a stop arranged in the path of said lever, the construction and arrangement being such that upon engagement of said stop and said lever, the latter is caused by reason of the advance movement of the carriage to turn upon its fulcrum, an intercepting device, and means between said device and said keys, whereby when the lever is vibrated said intercepting device is caused to move to a position for preventing the keys from moving the types to the printing-point.

53. In a type-writing machine, the combination with a series of types, operating-keys therefor, and a carriage including a slide-bar, of carriage-tracks arranged above and below said slide-bar, a margin-gage bar arranged over said upper track, a stop adjustable upon said margin-gage bar, a vertically-arranged lever pivoted upon said carriage slide-bar and constructed to engage at its upper end with said contact, a bar arranged below said lever and extending parallel with said carriage-tracks and provided at its ends with ears whereby it is pivoted to the ends of said lower track, said pivoted bar being operable by said vertical lever at variable points in the travel of said carriage as determined by the adjustment of said stop, and means operated by said pivoted bar for preventing the keys from moving the types to the printing-point.

54. In a type-writing machine, the combination with a series of types, operating-keys therefor, and a carriage, of two bars arranged parallel with the direction of movement of said carriage, an adjustable device arranged upon one of said bars, means operated by the second of said bars for preventing the keys from moving the types to the printing-point, and a lever pivoted upon the carriage and extending from the first to the second bar and constructed to engage said adjustable device during an advance movement of the carriage, and to be thereby turned upon its pivot and caused to operate said second bar.

55. In a type-writing machine, the combination with a series of types, operating-keys therefor, and a carriage, of a line-locking mechanism, a stop adjustable along the line of travel of the carriage, and a two-armed lever pivoted upon the carriage, one arm of said lever being adapted to engage said adjustable stop and the other arm thereof being constructed to operate said line-locking mechanism.

56. In a type-writing machine, the combination with a series of types, operating-keys therefor, and a carriage, of a stop adjustable along the travel of the carriage, a rocker-bar parallel with the carriage, line-locking devices operated by said rocker-bar, and means upon the carriage between said adjustable stop and said rocker-bar for engaging the latter and causing it to rock.

57. In a type-writing machine, the combination with a series of types, operating-keys therefor and a carriage, of a line-locking mechanism including a rocking bar which extends parallel with the travel of the carriage, a lever on the carriage for rocking said bar, and a stop independently supported upon the framework of the machine for vibrating said lever to rock said bar and lock the line.

58. In a type-writing machine, the combination with a series of types, operating-keys therefor and a carriage having a vertically-arranged pivoted lever, of a bar arranged above said carriage and carrying an adjustable stop adapted to actuate said lever, a bar arranged below said carriage and parallel therewith and adapted to be actuated by the said lever, and line-locking devices operated by said second bar.

59. In a type-writing machine, the combination with a series of types, operating-keys therefor, and a carriage, of two rocker-bars, a line-locking device operated by one of said bars, a stop adjustable along the second of said bars, and a device upon the carriage constructed to rock the first bar when engaged by said adjustable stop during the advance movement of the carriage, and also constructed to rock the second bar when engaging said stop during a return movement of the carriage.

60. In a type-writing machine, the combination with a series of types, operating-keys therefor, and a carriage, of a bar parallel with the carriage, line-locking mechanism operated by said bar, a stop supported independently of said bar and adjustable along the travel of the carriage and provided with an abrupt face and an oblique face, and a device upon the carriage adapted to engage the abrupt face of said stop during the advance movement of said carriage and to be thereby enabled to move the said bar crosswise to cause the line to lock, said device on the carriage being also constructed to engage the oblique face of said stop and force the latter out of its path during a return movement of the carriage.

61. In a type-writing machine, the combination with a series of types, operating-keys therefor, a carriage, and a line-locking mechanism, of a bail mounted upon the framework parallel with the carriage and connected to both the line-locking mechanism and an operating device on the carriage.

62. In a type-writing machine, the combination with a series of types, operating-keys therefor, a carriage, and an adjustable stop on the frame, of a rocking bar, a line-locking mechanism operated thereby, a lever on the carriage for rocking said bar to operate said line-locking mechanism, and a stop for arresting the movement of the lever, whereby the carriage is arrested when the line is locked.

63. In a type-writing machine, the combination with a series of types, operating-keys therefor, and a carriage including a slide-bar 9, of track 12 arranged over said slide-bar, bar 66 arranged over said track, stop 117 adjustable along said bar, lever 87 upon the carriage, and line-locking devices operated by said lever.

64. In a type-writing machine, the combination of a series of types, operating-keys therefor, a carriage, stop 117, lever 87 pivoted upon the carriage, bar 94, and intercepting-arm 112.

65. In a type-writing machine, the combination with a series of types, operating-keys therefor, and a carriage, of bar 94, adjustable stop 117 having an abrupt working face and an oblique or beveled face, a lever pivoted to the carriage and comprising both an arm 87 for engaging said stop and an arm 92 for engaging said bar 94, and a hook 112 connected to the latter and adapted to engage the dog-rocker.

66. In a type-writing machine, the combination of a series of types, keys therefor, a carriage, lever 87 fulcrumed upon the carriage, adjustable stop 117, stop 119, spring 90, and a line-locking mechanism, including bail 94 and hooked arm 112.

67. In a type-writing machine, the combination of a series of types, operating-keys therefor, a carriage, a lever fulcrumed upon said carriage, a releasable stop arranged in the path of said lever and adjustable in the direction of movement of said carriage, whereby upon engagement of said releasable stop and said lever at any point in the advance movement of said carriage the said lever is caused to turn upon its fulcrum by reason of the movement of the carriage, and means for preventing the keys from moving the device to the printing-point, said means being constructed to be operated by said lever during said turning movement thereof at variable points in the travel of said carriage at which said adjustable and releasable stop may cause said lever to turn, said stop being constructed to be moved out of the path of said lever to permit subsequent operation of the types.

68. In a type-writing machine, the combination of a series of types, operating-keys therefor, a carriage, a lever fulcrumed upon said carriage, an adjustable and releasable stop arranged in the path of said lever and constructed to turn the latter upon its fulcrum, and a line-locking mechanism including a bar arranged parallel with the carriage and operated by the turning movement of the lever, the construction and arrangement being such that said releasable stop may be moved out of the path of the lever to enable the latter to resume normal position.

69. In a type-writing machine, the combination of a series of types, operating-keys therefor, a carriage, two bars arranged parallel with the direction of movement of said carriage, an adjustable and releasable stop arranged upon one of said bars, line-locking mechanism connected to the second of said bars, and means connected to the carriage and controlled by said adjustable and releasable stop for moving the second bar and the line-locking devices, said stop being releasable to enable said line-locking devices to resume normal position.

70. In a type-writing machine, the combination with a series of types, operating-keys therefor, a carriage, and an escapement mechanism for said carriage, including a pivoted dog-rocker having a vertical dog-carrying arm and a horizontal arm, whereby said rocker is operated by said keys, of a depending hook pivoted upon the framework in proximity to said horizontal dog-rocker arm, means for enabling said hook to engage said horizontal arm and thereby prevent operation of said dog-rocker and said keys, and means for releasing said dog-rocker from the control of said hook, to permit additional letters to be written at the end of the line.

71. In a type-writing machine, the combination with a series of types, operating-keys therefor, and a carriage, of a movable bar arranged parallel with the carriage, an intercepting device connected to said bar and extending to a part constructed to reciprocate at each motion of the keys, a lever pivoted upon the carriage and constructed to operate said bar at various points in the travel of the carriage, means for causing a movement of said lever upon its pivot so as to move said bar and said intercepting device and thereby prevent operation of said reciprocatory part and of said keys, and means for releasing the latter from the control of said intercepting device.

72. In a type-writing machine, the combination with a series of types, operating-keys therefor, and a carriage, of two bars arranged parallel with the carriage, an adjustable stop arranged upon one of said bars, line-locking mechanism operated by the second of said bars, a lever pivoted upon the carriage and extending from the first to the second bar and constructed to engage said adjustable stop and to be turned thereby upon its pivot and caused to operate said second bar, and means for releasing said lever from the control of said stop.

73. In a type-writing machine, the combination with a series of types, operating-keys therefor, and a carriage, of two rocker-bars, a line-locking device operated by one of said bars, a stop adjustable along the second of said bars, and a device upon the carriage constructed to engage said stop and to be operated thereby to rock the first bar to lock the line, and also constructed to be released from said stop by a rocking movement of the second bar.

74. In a type-writing machine, the combination with a series of types, operating-keys therefor, and a carriage, of two rocker-bars, a line-locking device operated by one of said bars, a stop adjustable along the second of said bars, and a device upon the carriage constructed to engage said stop and to be operated thereby to rock the first bar to lock the line, and also constructed to be released from said stop by a rocking movement of the second bar, and also constructed to rock the second bar when engaging said stop during a return movement of the carriage.

75. In a type-writing machine, the combination with a series of types, operating-keys therefor, and a carriage, including slide 9, of track 12 arranged over said slide, pivoted bar 66 arranged over said track, adjustable slide 117 upon said bar, lever 87 upon the carriage, final stop 191, and a line-locking mechanism operated by said lever.

76. In a type-writing machine, the combination with a series of types, operating-keys therefor, and a carriage, of lever 87 fulcrumed on the carriage, adjustable and releasable stop 117, final stop 191, and a line-locking mechanism including bail 94.

77. In a type-writing machine, the combination with a series of types, operating-keys therefor, and a carriage, of lever 87 fulcrumed on the carriage, adjustable and releasable stop 117, stop 191, bar 94, and intercepting-arm 112.

78. In a type-writing machine, the combination with a series of types, operating-keys therefor, and a carriage, of a lever fulcrumed upon said carriage, a stop arranged in the path of said lever and adjustable in the direction of movement of said carriage and also constructed to operate said lever, and a combined bell striking and line-locking mechanism actuated by said lever during the turning movements thereof.

79. In a type-writing machine, the combination with a series of types, operating-keys therefor, and a carriage, of a lever fulcrumed upon said carriage, an adjustable slide having a contact and a stop each constructed to turn the lever, and a combined bell striking and line-locking mechanism, including a bar arranged parallel with the carriage and constructed to be actuated by said lever during its turning movements.

80. In a type-writing machine, the combination with a series of types, operating-keys therefor, and a carriage, including a slide-bar, of carriage-tracks arranged above and below said slide-bar, a margin-gage bar arranged over said upper track, a device adjustable upon said margin-gage bar and provided with two contacts or stops, a vertically-arranged lever pivoted upon said carriage slide-bar and constructed to engage by its upper end said stops or contacts, a rocker-bar arranged below said lever and parallel with the carriage, and bell striking and line-locking devices operated by said rocker-bar.

81. In a type-writing machine, the combination with a series of types, operating-keys therefor, and a carriage, of two bars arranged parallel with the carriage, an adjustable device arranged upon one of said bars, both a bell striking device and a line-locking device connected to the second of said bars, and a lever pivoted upon the carriage and extending from the first to the second bar and constructed to engage said adjustable device and to be thereby turned upon its pivot and caused to operate said second bar.

82. In a type-writing machine, the combination with a series of types, operating-keys therefor, and a carriage, of a combined bell striking and line-locking mechanism, a stop adjustable along the line of travel of the carriage, and a two-armed lever pivoted upon the carriage, one arm of said lever being adapted to engage said adjustable stop or contact and the other arm thereof being constructed to operate said combined bell striking and line-locking mechanism.

83. In a type-writing machine, the combination with a series of types, operating-keys therefor, and a carriage, of bar 94, adjustable stops 104 and 117, each having an abrupt or working face and an oblique or beveled face, a trip-lever pivoted to the carriage and comprising both an arm 87 for engaging said stops and an arm 92 for engaging said bar 94, and both bell striking devices and line-locking devices connected to the bar 94.

84. In a type-writing machine, the combination with a series of types, operating-keys therefor, and a carriage, of two contacts adjustable along the line of carriage travel, a lever pivoted upon the carriage and constructed to be operated by said contacts, bell striking devices actuated by said lever when the latter is operated by the first of said contacts, line-locking devices actuated by said lever when the latter is operated by the second of said contacts, and means for releasing said lever from the control of said second contact, whereby additional letters may be written.

85. In a type-writing machine, the combination with a series of types, operating-keys therefor, and a carriage, of two contacts adjustable along the line of carriage travel, a lever pivoted upon the carriage and constructed to be operated by said contacts, bell striking devices actuated by said lever when the latter is operated by the first of said contacts, line-locking devices actuated by said lever when the latter is operated by the second of said contacts, means for releasing said lever from control of said second contact, whereby additional letters may be written, and means for again vibrating said lever and causing the latter to finally lock the line.

86. In a type-writing machine, the combination with a series of types, operating-keys therefor, and a carriage, of a bell striking device, means for preventing said keys from moving said types to the printing-point, and a lever pivoted upon the carriage and constructed to turn upon its pivot and thereby operate said bell striking device and said line-locking mechanism, and also constructed to arrest the carriage and prevent its further advance movement.

87. In a type-writing machine, the combination with a series of types, operating-keys therefor, and a carriage, of a bell striking device, mechanism for preventing said keys from moving said types to the printing-point, and a member constructed to control both said bell striking device and said line-locking mechanism, said member being operatively connected to said carriage and being constructed and arranged to operate said bell striking device by a limited movement, and to operate said line-locking mechanism by a greater movement in the same direction.

88. In a type-writing machine, the combination with a series of types, operating-keys therefor, and a carriage, of a margin-gage bar, a gage adjustable thereon and provided with two projections or working faces, a bell striking device, mechanism for preventing said keys from moving said types to the printing-point, and a member independently movable upon said carriage and constructed to coact with said adjustable gage to control both said bell striking device and said line-locking mechanism, said independently-movable member being constructed to contact with one of said projections upon said adjustable gage and to be thereby given a limited movement, whereby said member is caused to operate said bell striking device, and said independently-movable member being also constructed to thereupon slip off from said projection and thereby release said bell striking device, whereby an alarm is sounded, and being further constructed and arranged to thereupon engage the other of said projections upon said adjustable gage and to be thereby given a further independent movement in the same direction and caused to operate said line-locking mechanism.

89. In a type-writing machine, the combination of a series of types, operating-keys therefor, and a carriage, of a bell striking device, mechanism for preventing said keys from moving said types to the printing-point, a movable bar arranged parallel with the carriage and controlling both said bell striking device and said line-locking mechanism, means upon the carriage for operating said movable bar, and adjustable means for determining at what part of the longitudinal travel of the carriage said movable bar shall be operated, the construction and arrangement being such that during the advance movements of the carriage said bar is first given a limited movement to operate said bell striking device, and is thereafter given a greater movement in the same direction to operate said line-locking mechanism.

90. In a type-writing machine, the combination with a series of types, operating-keys therefor, and a carriage, of a bell striking device, mechanism for preventing said keys from moving said types to the printing-point, a movable bar arranged parallel with the travel of the carriage and operatively connected to both said bell striking device and said line-locking mechanism, a lever pivoted upon said carriage and constructed to engage and control said movable bar, a margin-gage bar, a gage adjustable thereon and provided with two working faces, with each of which said pivoted lever is constructed to engage, so that during the advance movements of the carriage said lever is caused to turn about its pivot, whereby said movable bar and said bell striking device are operated, the construction and arrangement being such that during the movement of the carriage said lever slips off from the first of the working faces upon said adjustable gage and thereby releases said movable bar and enables said bell striking device to sound an alarm, and such that thereupon said pivoted lever engages the second face upon said adjustable slide and is thereby caused, through subsequent advance movements of the carriage, to give said movable bar a greater movement in the same direction, so as to operate said line-locking mechanism, and means for limiting the turning movement of said lever, whereby said carriage is arrested.

91. In a type-writing machine, the combination with a series of types, operating-keys therefor and a carriage, of two bars arranged parallel with the direction of movement of said carriage, an adjustable device arranged upon one of said bars, a bell striking device connected to the second of said bars, means also connected to said second bar for preventing said keys from moving said types to the printing-point, and means connected to the carriage and controlled by said adjustable device for moving said second bar so as to operate said bell striking device and also so as to prevent the movement of the types to the printing-point.

92. In a type-writing machine, the combination with a series of types, operating-keys therefor, and a carriage, of an escapement mechanism for said carriage, including a pivoted dog-rocker, comprising both a vertical arm carrying escapement-dogs and a horizontal arm connected to said keys, whereby said dog-rocker is operated, a hook pivoted upon the framework of the machine and extending to said horizontal dog-rocker arm, a movable bar arranged parallel with the carriage travel and engaging said hook, a bell-striker also connected to said bar, a lever pivoted upon said carriage and constructed to engage said movable bar, and a device adjustable in a direction parallel with the movement of said carriage and constructed to engage said pivoted lever, so that the latter is caused during the advance movements of the carriage to turn upon its pivot and operate said movable bar, both to cause said bell striking device to sound an alarm and also to cause said hook to engage said dog-rocker arm and prevent subsequent movement of said arm and hence of said keys.

93. In a type-writing machine, the combination with a series of types, operating-keys therefor, and a carriage, of a bar movable in a direction transversely of its length, means connected to said bar and operated during said transverse movement thereof for sounding an alarm and also for preventing said keys from moving said types to the printing-point, said bar being arranged parallel with the carriage and adjacent thereto, and means upon said carriage for giving said bar a limited transverse movement to cause the sounding of the alarm, and also for giving said bar a greater transverse movement for operating said line-locking mechanism, said bar-operating means being constructed to operate the bar at varying predetermined points in the travel of the carriage.

94. In a type-writing machine, the combination with a series of types, operating-keys therefor, and a carriage, of a margin-gage bar, a device adjustable along said bar, a bell striking device, means for preventing said keys from moving said types to the printing-point, and means controlled by said adjustable device and connected to the carriage and arranged between said adjustable device and the bell striking and line-locking devices for operating the latter.

95. In a type-writing machine, the combination with a series of types, operating-keys therefor, and a carriage, of a bell striking device and line-locking mechanism, a bar arranged parallel with the travel of the carriage and operatively connected to both said bell striking device and said line-locking mechanism, a lever pivoted upon the carriage above said bar and comprising an elbow, the angle of which normally engages said bar, and also comprising vertical arm 87, a margin-gage bar, and a slide arranged upon said bar and provided with two working faces, each of which is constructed to engage the upper end of said arm 87, whereby during the advance movements of the carriage, said lever is given a limited rotation upon its pivot and said movable bar is forced downwardly to a limited extent by the angle of said elbow, the construction and arrangement being such that the upper end of said arm 87 thereupon slips off from the first working face upon said adjustable slide, a spring connected to said lever for thereupon causing it to resume normal position upon said carriage, and the construction and arrangement being further such that said arm thereupon contacts with the second of said working faces upon said adjustable slide and causes the extreme end of said elbow to engage said movable bar, to give it a further movement in the same direction and cause said line-locking device to operate.

96. In a type-writing machine, the combination with a series of types, operating-keys therefor, and a carriage, of a bell striking device, a line-locking mechanism, a device adjustable in the direction of travel of said carriage, and a tripping-lever pivoted upon said carriage between said adjustable device and said bell striking and line-locking mechanism, and constructed to coöperate with said adjustable device so as to cause successively a movement of the bell striking device and an operation of the line-locking mechanism.

97. In a type-writing machine, the combination with a series of types, operating-keys therefor, and a carriage, of a bell striking device, a line-locking mechanism, a margin-gage bar journaled upon a fixed portion of the machine and provided with a finger-piece whereby it may be turned in its bearings, a device adjustable along said margin-gage bar, and a tripping-lever pivoted upon said carriage and constructed to coöperate with said adjustable device so as to cause successively a movement of the bell striking device and an operation of the line-locking mechanism, the construction and arrangement being such that said margin-gage bar may then be turned by said finger-piece to release said tripping-lever from the control of said adjustable device, whereby said line-locking mechanism is released, so that additional letters may be written upon the line.

98. In a type-writing machine, the combination with a carriage, of a bar arranged parallel with the travel of said carriage, a lever pivoted upon said carriage and constructed to engage said bar, a margin-gage bar, a device adjustable along said margin-gage bar and constructed to engage said lever to cause it to turn upon its pivot and operate said movable bar and bell-striking device, whereby the approach of the end of the line is indicated, a second device also adjustable along said margin-gage bar and constructed to engage said lever to limit the return movements of said carriage, and means for enabling said lever at will to pass said second adjustable device, so as to permit writing in the left-hand margin upon the paper, the construction and arrangement being such that said lever also engages said second adjustable device and is caused thereby to vibrate during the subsequent advance movements of the carriage, and such that said lever slips off from said second adjustable device, whereby an alarm is sounded so as to notify the operator that the margin is filled.

99. In a type-writing machine, the combination with a series of types, operating-keys therefor, and a carriage, of a bell striking device, means for preventing said keys from moving said types to the printing-point, and a lever pivoted upon the carriage and constructed to turn upon its pivot and thereby operate said bell striking device and said line-locking mechanism, and also constructed to arrest the carriage and prevent its further advance movement, and also to limit the return movements of the carriage.

100. In a type-writing machine, the combination with a series of types, operating-keys therefor, and a carriage, of a bell striking device, means for preventing said keys from moving said types to the printing-point, and a lever pivoted upon the carriage and constructed to turn upon its pivot and thereby operate said bell striking device and said line-locking mechanism and also to arrest the carriage and prevent its further advance movement, an adjustable device for coacting with said lever to limit the return movements of the carriage, and means for enabling said lever to pass said adjustable device, to enable words to be written in the left-hand margin upon the written page, said lever being also constructed to coact with said adjustable device during subsequent advance movements of the carriage, so as to again operate said bell striking device and notify the operator that the margin is filled.

101. In a type-writing machine, the combination with a series of types, operating-keys therefor and a carriage, of lever 87 pivoted on the carriage and adapted to ring the bell and lock the line on the forward traverse of the carriage, stop 91, and stop 86 adapted to arrest said lever on the return movement of the carriage and thereby arrest the carriage at variable predetermined points.

102. In a type-writing machine, the combination with a series of types, operating-keys therefor and a carriage, of rocker-bar 66, adjustable stops 104, 117 and 86, lever 87 pivoted upon the carriage, stops 91 and 119 upon the carriage, stops 191 and 192 upon the framework, and a combined bell-ringing and line-locking mechanism actuated by said lever.

103. In a type-writing machine, the combination with a platen and a platen-frame, of a horizontal rod secured in the end bars of said platen-frame in rear of the platen, a pair of depending arms hinged upon said rod, a pressure-roller journaled in the lower ends of said arms, a forwardly-extending spring secured to each of said arms and provided at its forward end with a bearing, a second roller journaled in said bearings, and means for pressing said depending arms toward the platen.

104. In a type-writing machine, the combination with a platen and a platen-frame, of a horizontal rod extending parallel with the platen and rigidly secured upon said platen-frame, a pair of collars rigidly secured to said rod, each collar having a cut-away portion or opening, a pair of depending arms whose upper ends are arranged in said openings and hinged upon said rod, a horizontal shaft journaled in the lower ends of said arms, a pressure-roller mounted upon said horizontal shaft, a spring rigidly secured at its lower end to the lower end of each of said arms and having a bearing at its upper end against each of said collars, said spring also extending forwardly at its lower portion and being provided at its forward end with a bearing, a second shaft carried by said bearings, and a pressure-roller arranged upon said second shaft.

105. In a type-writing machine, the combination with a platen and a platen-frame, of a pair of depending arms suitably hinged upon the platen-frame, means for pressing said arms toward the platen, a pressure-roller carried by the lower ends of said arms, spring mechanism carried by said arms, a pressure-roller independently supported upon said spring mechanism forwardly of the first-mentioned pressure-roller, the construction and arrangement being such that each of said pressure-rollers bears independently against the platen, a rock-shaft journaled in the end bars of the platen-frame and provided with tappets, whereby said rock-shaft is enabled to swing said depending arms rearwardly, and a finger-lever secured upon said rock-shaft, the construction and arrangement being such that upon the operation of said finger-lever said rock-shaft is rocked, said depending arms are swung rearwardly and all of said pressure-rollers are moved away from said platen.

106. In a type-writing machine, the combination with a platen and a platen-frame, of a sheet-metal deflector pivotally supported upon said platen-frame, a pair of pendent swinging arms also supported upon said platen-frame independently of said deflector, means for pressing said arms toward said platen, pressure-rollers carried by said arms and pressed independently against said platen, and means also carried by said arms for independently pressing said deflector against said platen.

107. In a type-writing machine, the combination with a platen and a platen-frame, of a paper-shelf, a clutch secured thereto, and a rod carried by said platen-frame wherewith said clutch engages, the construction and arrangement being such that said paper-shelf may be turned about said rod as a center and such that the friction of said clutch on said rod maintains the paper-shelf in any position to which it may be turned, and being further such that said clutch may yield to enable the paper-shelf to be withdrawn from said rod and to be replaced thereupon.

108. In a type-writing machine, the combination with a platen and a platen-frame, of a hinge-rod supported upon said platen-frame, a paper-shelf, a pair of clutches secured to said paper-shelf and formed with laterally-extending bosses or hubs which are bored to form an opening for said rod and are also cut away or notched, and a long slot formed in the body of each of said clutches and intersecting said hubs or bosses so as to enable the said clutch to yield so that said paper-shelf may be pulled off from said rod and replaced thereon, said clutches permitting said paper-shelf to be swung bodily about said rod, and the pressure of the clutches being sufficient to hold the paper-shelf firmly in place upon the rod.

109. In a type-writing machine, a platen-frame, a suitable track for said platen-frame, a margin-gage bar arranged in rear of said platen, a margin-controlling device adjustable along said bar, a paper-shelf arranged upon said carriage and extending over said margin-gage bar, and means for enabling said paper-shelf to be moved in a direction transversely of its length so as to give access to said margin-gage bar and the adjustable device thereon.

110. In a type-writing machine, a paper-carriage having a paper-table extending rearwardly over adjustable margin stop devices on the framework and immediately behind said table, the latter being arranged to be swung forwardly so as to afford access to said adjustable margin devices.

111. In a type-writing machine, the combination with a platen and a platen-frame, of a paper-shelf arranged in rear of the platen, and a rigid frame-like extension detachably secured to said paper-shelf and extending upwardly and rearwardly to serve as a support for the paper.

112. In a type-writing machine, the combination with a platen of a platen-frame, of a paper-shelf arranged in rear of the platen, a strip secured to the under side of said paper-shelf and having its ends bent or fluted to form openings, and a frame formed with prongs for detachably engaging said openings, said frame extending upwardly and rearwardly from said paper-shelf.

113. In a type-writing machine, the combination with a carriage slide-bar, of a track arranged below said slide-bar, a track arranged above said slide-bar, said tracks and said slide-bar being provided with ball-bearing grooves, brackets to which said tracks are attached, an ear formed upon said upper track about midway between said brackets, a screw passing downwardly through said ear, and a fixed bracket engaged by said screw, whereby said upper track may be adjusted.

114. In a type-writing machine, the combination with a carriage slide-bar, of a track arranged below said slide-bar and a track arranged above said slide-bar, said tracks and said slide-bar being provided with ball-bearing grooves, brackets to which said tracks are attached, and a screw passing upwardly into said lower track at a point about midway between said brackets, said screw also engaging a fixed portion of the machine, whereby said lower track may be adjusted.

115. In a type-writing machine, the combination with a carriage slide-bar of an upper adjustable fixed rail and a lower independently-adjustable fixed rail.

116. In a type-writing machine, the combination with a carriage slide-bar, of a track arranged below said slide-bar, a track arranged above said slide-bar, said tracks and said slide-bar being provided with ball-bearing grooves, brackets to which said tracks are attached, an ear formed upon said upper track about midway between said brackets, a screw passing downwardly through said ear, a fixed bracket engaged by said screw, whereby said upper track may be adjusted, and a screw passing upwardly into said lower track and engaging a fixed portion of the machine, whereby said lower track may be adjusted.

Signed in the borough of Manhattan, city of New York, in the county of New York and State of New York, this 11th day of April, A. D. 1900.

JACOB FELBEL.

Witnesses:
K. V. DONOVAN,
FLORENCE KEELING.